(12) United States Patent
Masuda et al.

(10) Patent No.: US 11,648,543 B2
(45) Date of Patent: *May 16, 2023

(54) FUNCTIONAL STRUCTURAL BODY AND METHOD FOR MAKING FUNCTIONAL STRUCTURAL BODY

(71) Applicants: NATIONAL UNIVERSITY CORPORATION HOKKAIDO UNIVERSITY, Sapporo (JP); FURUKAWA ELECTRIC CO., LTD., Tokyo (JP)

(72) Inventors: Takao Masuda, Sapporo (JP); Yuta Nakasaka, Sapporo (JP); Takuya Yoshikawa, Sapporo (JP); Sadahiro Kato, Tokyo (JP); Masayuki Fukushima, Tokyo (JP); Kojiro Inamori, Tokyo (JP); Hiroko Takahashi, Tokyo (JP); Yuichiro Banba, Tokyo (JP); Kaori Sekine, Tokyo (JP)

(73) Assignees: NATIONAL UNIVERSITY CORPORATION HOKKAIDO UNIVERSITY, Sapporo (JP); FURUKAWA ELECTRIC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,650

(22) Filed: Nov. 27, 2019

(65) Prior Publication Data
US 2020/0108378 A1 Apr. 9, 2020

Related U.S. Application Data

(63) Continuation of application No. PCT/JP2018/021080, filed on May 31, 2018.

(30) Foreign Application Priority Data

May 31, 2017 (JP) .............................. JP2017-108589

(51) Int. Cl.
*B01J 29/06* (2006.01)
*B01J 29/78* (2006.01)
(Continued)

(52) U.S. Cl.
CPC .............. *B01J 29/78* (2013.01); *B01D 53/94* (2013.01); *B01J 23/002* (2013.01); *B01J 23/02* (2013.01);
(Continued)

(58) Field of Classification Search
CPC .......... B01J 29/14; B01J 29/16; B01J 29/405; B01J 29/46; B01J 29/48; B01J 29/67; B01J 29/655; B01J 29/68; B01J 29/69; B01J 29/085; B01J 29/12; B01J 29/035; B01J 29/0352; B01J 29/40; B01J 29/44; B01J 29/74; B01J 29/72; B01J 29/0356; B01J 29/0358; B01J 29/7049; B01J 29/072; B01J 29/068; B01J 29/076; B01J 29/7084; B01J 29/7669; B01J 29/7869; B01J 29/89; B01J 29/76; B01J 29/78; B01J 2229/14; B01J 2229/186; B01J 23/02; B01J 23/002; B01J 23/10; B01J 23/16; B01J 23/44; B01J 23/08; B01J 23/26; B01J 23/34; B01J 23/60; B01J 23/64; B01J 23/6447; B01J 23/72; B01J 23/74; B01J 23/78; B01J 23/80; B01J 23/83; B01J 23/825; B01J 23/89; B01J 23/894; B01J 23/8946; B01J 23/8953; B01J 23/896; B01J 23/8986; B01J 29/8993; B01J 23/8892; B01J 23/8871; B01J 23/8872; B01J 23/8873; B01J 23/8874; B01J 23/8876; B01J 23/8877; B01J 23/8878; B01J 35/0013; B01J 35/006; B01J 35/0066; B01J 35/04;
(Continued)

(56) References Cited

U.S. PATENT DOCUMENTS 3,898,180 A 8/1975 Crooks et al.
4,552,855 A 11/1985 Ozin et al.
(Continued)

FOREIGN PATENT DOCUMENTS

AU 2012324802 A1 6/2014
CA 2256515 A1 12/1997
(Continued)

OTHER PUBLICATIONS

Cho et al., "Zeolite-Encapsualted Pt Nanoparticlles for Tandem Catalysis", J. Am. Chern. Soc., 2018, 140, pp. 13514-13520.*
Li et al., "Ultrastable Perovskite-Zeolite Composite Enabled by Encapsulation and In Situ Passivation", Angew. Chern. Sep. 2020, 132, pp. 23300-23306.*
Wang et al., "In Situ Encapsulated Pt Nanoparticles Dispersed in Low Temperature Oxygen for Partial Oxidation of Methane to Syngas", Catalysts, 2019, 9, pp. 720-734.*
Do et al., "Zeolite Nanoclusters Coated onto the Mesopore Walls of SBA-15", J. Am. Chem. Soc. 2004, 126, pp. 14324-14325.*
(Continued)

*Primary Examiner* — Elizabeth D Wood
(74) *Attorney, Agent, or Firm* — Dorsey & Whitney LLP

(57) ABSTRACT

Provide is a functional structural body that can suppress aggregation of metal oxide nanoparticles and prevent functional loss of metal oxide nanoparticles, and thus exhibit a stable function over a long period of time. A functional structural body (1) includes: a skeletal body (10) of a porous structure composed of a zeolite-type compound; and at least one type of metal oxide nanoparticles (20) containing a perovskite-type oxide present in the skeletal body (10), the skeletal body (10) having channels (11) that connect with each other, and the metal oxide nanoparticles (20) being present at least in the channels (11) of the skeletal body (10).

13 Claims, 4 Drawing Sheets

(51) Int. Cl.

| | |
|---|---|
| B01D 53/94 | (2006.01) |
| B01J 23/00 | (2006.01) |
| B01J 29/70 | (2006.01) |
| B01J 29/72 | (2006.01) |
| B01J 35/00 | (2006.01) |
| B01J 35/04 | (2006.01) |
| B01J 35/10 | (2006.01) |
| B01J 37/00 | (2006.01) |
| B01J 37/10 | (2006.01) |
| B01J 29/65 | (2006.01) |
| B01J 29/68 | (2006.01) |
| B01J 29/67 | (2006.01) |
| B01J 29/40 | (2006.01) |
| B01J 29/16 | (2006.01) |
| B01J 29/69 | (2006.01) |
| B01J 29/48 | (2006.01) |
| B01J 29/14 | (2006.01) |
| B01J 29/46 | (2006.01) |
| B01J 29/035 | (2006.01) |
| B01J 29/08 | (2006.01) |
| B01J 29/44 | (2006.01) |
| B01J 29/12 | (2006.01) |
| B01J 29/74 | (2006.01) |
| B01J 29/76 | (2006.01) |
| B01J 29/072 | (2006.01) |
| B01J 29/076 | (2006.01) |
| B01J 29/068 | (2006.01) |
| B01J 29/89 | (2006.01) |
| B01J 23/44 | (2006.01) |
| B01J 23/26 | (2006.01) |
| B01J 23/16 | (2006.01) |
| B01J 23/644 | (2006.01) |
| B01J 23/02 | (2006.01) |
| B01J 23/72 | (2006.01) |
| B01J 23/08 | (2006.01) |
| B01J 23/74 | (2006.01) |
| B01J 23/10 | (2006.01) |
| B01J 23/34 | (2006.01) |
| B01J 23/60 | (2006.01) |
| B01J 23/64 | (2006.01) |
| B01J 23/83 | (2006.01) |
| B01J 23/89 | (2006.01) |
| B01J 23/78 | (2006.01) |
| B01J 23/80 | (2006.01) |
| B01J 23/825 | (2006.01) |
| B01J 23/887 | (2006.01) |
| B01J 23/889 | (2006.01) |
| B01J 37/18 | (2006.01) |
| B01J 37/02 | (2006.01) |
| C01B 39/02 | (2006.01) |

(52) U.S. Cl.
CPC ............ *B01J 23/08* (2013.01); *B01J 23/10* (2013.01); *B01J 23/16* (2013.01); *B01J 23/26* (2013.01); *B01J 23/34* (2013.01); *B01J 23/44* (2013.01); *B01J 23/60* (2013.01); *B01J 23/64* (2013.01); *B01J 23/6447* (2013.01); *B01J 23/72* (2013.01); *B01J 23/74* (2013.01); *B01J 23/78* (2013.01); *B01J 23/80* (2013.01); *B01J 23/825* (2013.01); *B01J 23/83* (2013.01); *B01J 23/8871* (2013.01); *B01J 23/8872* (2013.01); *B01J 23/8873* (2013.01); *B01J 23/8874* (2013.01); *B01J 23/8876* (2013.01); *B01J 23/8877* (2013.01); *B01J 23/8878* (2013.01); *B01J 23/8892* (2013.01); *B01J 23/89* (2013.01); *B01J 23/894* (2013.01); *B01J 23/896* (2013.01); *B01J 23/8946* (2013.01); *B01J 23/8953* (2013.01); *B01J 23/8986* (2013.01); *B01J 23/8993* (2013.01); *B01J 29/035* (2013.01); *B01J 29/0352* (2013.01); *B01J 29/0356* (2013.01); *B01J 29/0358* (2013.01); *B01J 29/068* (2013.01); *B01J 29/072* (2013.01); *B01J 29/076* (2013.01); *B01J 29/085* (2013.01); *B01J 29/12* (2013.01); *B01J 29/14* (2013.01); *B01J 29/16* (2013.01); *B01J 29/40* (2013.01); *B01J 29/405* (2013.01); *B01J 29/44* (2013.01); *B01J 29/46* (2013.01); *B01J 29/48* (2013.01); *B01J 29/655* (2013.01); *B01J 29/67* (2013.01); *B01J 29/68* (2013.01); *B01J 29/69* (2013.01); *B01J 29/7049* (2013.01); *B01J 29/7084* (2013.01); *B01J 29/72* (2013.01); *B01J 29/74* (2013.01); *B01J 29/76* (2013.01); *B01J 29/7669* (2013.01); *B01J 29/7869* (2013.01); *B01J 29/89* (2013.01); *B01J 35/006* (2013.01); *B01J 35/0013* (2013.01); *B01J 35/0066* (2013.01); *B01J 35/04* (2013.01); *B01J 35/1057* (2013.01); *B01J 35/1061* (2013.01); *B01J 37/0018* (2013.01); *B01J 37/0205* (2013.01); *B01J 37/10* (2013.01); *B01J 37/18* (2013.01); *C01B 39/02* (2013.01); *B01D 2255/2042* (2013.01); *B01D 2255/2063* (2013.01); *B01D 2255/2073* (2013.01); *B01D 2255/2092* (2013.01); *B01D 2255/20746* (2013.01); *B01D 2255/50* (2013.01); *B01D 2255/9202* (2013.01); *B01J 2229/14* (2013.01); *B01J 2229/186* (2013.01)

(58) Field of Classification Search
CPC ............ B01J 35/1061; B01J 35/1057; B01J 37/0018; B01J 37/0205; B01J 37/0211; B01J 37/10; B01J 37/18; F01N 3/2828; F01N 2510/063; F01N 2330/06; F01N 2330/30; F01N 2370/04; B01D 53/94; B01D 53/9409; B01D 53/9413; B01D 2255/2042; B01D 2255/2063; B01D 2255/2073; B01D 2255/20738; B01D 2255/20746; B01D 2255/20753; B01D 2255/20761; B01D 2255/2092; B01D 2255/402; B01D 2255/9155; C01B 39/02
USPC ........ 502/60, 61, 63, 64, 65, 66, 69, 71, 73, 502/74, 77, 79
See application file for complete search history.

(56) References Cited

U.S. PATENT DOCUMENTS

| | | |
|---|---|---|
| 5,026,673 A | 6/1991 | Gates et al. |
| 5,236,575 A | 8/1993 | Bennett et al. |
| 5,275,720 A | 1/1994 | Ward |
| 5,849,652 A | 12/1998 | Davies et al. |
| 5,994,603 A | 11/1999 | Mohr et al. |
| 6,040,259 A | 3/2000 | Mohr et al. |
| 6,831,203 B1 | 12/2004 | Mohr et al. |
| 6,881,703 B2 | 4/2005 | Cutler et al. |
| 7,074,373 B1 | 7/2006 | Warren et al. |
| 7,592,291 B2 | 9/2009 | Rollins et al. |
| 7,893,311 B2 | 2/2011 | Takamatsu et al. |
| 11,161,101 B2 * | 11/2021 | Kato ............... B01J 23/464 |
| 2003/0109383 A1 | 6/2003 | Koike et al. |
| 2003/0188991 A1 | 10/2003 | Shan et al. |
| 2004/0176245 A1 | 9/2004 | Hagemeyer et al. |
| 2004/0192947 A1 | 9/2004 | Chane-ching et al. |
| 2005/0201920 A1 | 9/2005 | Shan et al. |

(56) References Cited

U.S. PATENT DOCUMENTS

| | | |
|---|---|---|
| 2006/0211777 A1 | 9/2006 | Severinsky |
| 2006/0216227 A1 | 9/2006 | Idem et al. |
| 2007/0004593 A1 | 1/2007 | Ohno et al. |
| 2007/0167551 A1 | 7/2007 | Goodwin et al. |
| 2008/0045400 A1 | 2/2008 | Rollins et al. |
| 2008/0045403 A1 | 2/2008 | Rollins et al. |
| 2008/0051280 A1 | 2/2008 | Hagemeyer et al. |
| 2008/0072705 A1 | 3/2008 | Chaumonnot et al. |
| 2008/0280754 A1 | 11/2008 | Toledo et al. |
| 2008/0293990 A1 | 11/2008 | Stevenson et al. |
| 2009/0286677 A1 | 11/2009 | Takeshima et al. |
| 2009/0325790 A1 | 12/2009 | Haller et al. |
| 2010/0004118 A1 | 1/2010 | Liu et al. |
| 2011/0085944 A1 | 4/2011 | Rolllins et al. |
| 2011/0092356 A1 | 4/2011 | Rollins et al. |
| 2011/0092745 A1 | 4/2011 | Senoo et al. |
| 2011/0121238 A1 | 5/2011 | Wakatsuki |
| 2011/0293941 A1 | 12/2011 | Chaumonnot et al. |
| 2012/0042631 A1 | 2/2012 | Schmieg et al. |
| 2012/0060472 A1 | 3/2012 | Li et al. |
| 2012/0130138 A1 | 5/2012 | Yamaguchi et al. |
| 2012/0142238 A1 | 6/2012 | Saitou et al. |
| 2012/0231948 A1 | 9/2012 | Saito |
| 2013/0041174 A1 | 2/2013 | Yamamoto et al. |
| 2013/0090445 A1 | 4/2013 | Hattori et al. |
| 2014/0021096 A1 | 1/2014 | Chaumonnot et al. |
| 2014/0128246 A1 | 5/2014 | Garcia-martinez |
| 2014/0147362 A1 | 5/2014 | Sasaki et al. |
| 2014/0284524 A1 | 9/2014 | Lee et al. |
| 2014/0303266 A1* | 10/2014 | Hyman ............... B01J 29/146 502/79 |
| 2015/0018590 A1 | 1/2015 | Stevenson et al. |
| 2015/0290635 A1 | 10/2015 | Inokawa et al. |
| 2015/0367332 A1* | 12/2015 | Kuvettu ............. B01J 35/1066 502/66 |
| 2016/0017238 A1 | 1/2016 | Stamires et al. |
| 2016/0023913 A1 | 1/2016 | Goel et al. |
| 2016/0024400 A1 | 1/2016 | Iwasa et al. |
| 2016/0030934 A1 | 2/2016 | Zhan et al. |
| 2016/0032202 A1 | 2/2016 | Yonemura et al. |
| 2016/0087285 A1 | 3/2016 | Watanabe et al. |
| 2016/0114314 A1 | 4/2016 | Ali et al. |
| 2016/0137516 A1 | 5/2016 | Kegnæs et al. |
| 2016/0369174 A1 | 12/2016 | Kool et al. |
| 2017/0036197 A1 | 2/2017 | Kegnæs et al. |
| 2018/0194700 A1 | 7/2018 | Pan et al. |
| 2019/0039056 A1 | 2/2019 | Kato et al. |
| 2020/0094229 A1 | 3/2020 | Masuda et al. |
| 2020/0094232 A1 | 3/2020 | Masuda et al. |
| 2020/0108374 A1 | 4/2020 | Masuda et al. |
| 2020/0114335 A1 | 4/2020 | Masuda et al. |
| 2020/0114336 A1 | 4/2020 | Masuda et al. |
| 2020/0114337 A1 | 4/2020 | Masuda et al. |
| 2020/0114338 A1 | 4/2020 | Masuda et al. |
| 2020/0114339 A1 | 4/2020 | Masuda et al. |
| 2020/0114341 A1 | 4/2020 | Masuda et al. |
| 2020/0115248 A1 | 4/2020 | Masuda et al. |
| 2020/0115640 A1 | 4/2020 | Masuda et al. |
| 2020/0254432 A1* | 8/2020 | Shirman ............. B01J 37/0009 |

FOREIGN PATENT DOCUMENTS

| | | |
|---|---|---|
| CN | 1223602 A | 7/1999 |
| CN | 1720098 A | 1/2006 |
| CN | 1729138 A | 2/2006 |
| CN | 1876766 A | 12/2006 |
| CN | 101130466 A | 2/2008 |
| CN | 101180125 A | 5/2008 |
| CN | 101362959 A | 2/2009 |
| CN | 101720252 A | 6/2010 |
| CN | 101909750 A | 12/2010 |
| CN | 102056869 A | 5/2011 |
| CN | 102099114 A | 6/2011 |
| CN | 102247887 A | 11/2011 |
| CN | 102400744 A | 4/2012 |
| CN | 102574120 A | 7/2012 |
| CN | 102844115 A | 12/2012 |
| CN | 103459012 A | 12/2013 |
| CN | 103663490 A | 3/2014 |
| CN | 103889577 A | 6/2014 |
| CN | 104650291 A | 5/2015 |
| CN | 105008492 A | 10/2015 |
| CN | 105347359 A | 2/2016 |
| CN | 106362787 A | 2/2017 |
| EP | 0485180 A1 | 5/1992 |
| EP | 1709125 A1 | 10/2006 |
| EP | 2484444 A1 | 8/2012 |
| EP | 2692439 A1 | 2/2014 |
| EP | 2992984 A1 | 3/2016 |
| JP | S5746925 A | 3/1982 |
| JP | H0549943 | * 3/1993 |
| JP | H0549943 A | 3/1993 |
| JP | H06-142456 A | 5/1994 |
| JP | H07-096195 A | 4/1995 |
| JP | H08155303 A | 6/1996 |
| JP | H1133412 A | 2/1999 |
| JP | H11151440 A | 6/1999 |
| JP | 2000197822 A | 7/2000 |
| JP | 2000511107 A | 8/2000 |
| JP | 2000323164 A | 11/2000 |
| JP | 2002255537 A | 9/2002 |
| JP | 2002336704 A | 11/2002 |
| JP | 2004528158 A | 9/2004 |
| JP | 2005170903 A | 6/2005 |
| JP | 2005189586 A | 7/2005 |
| JP | 2005270734 A | 10/2005 |
| JP | 2005314208 A | 11/2005 |
| JP | 2006021994 A | 1/2006 |
| JP | 2007130525 A | 5/2007 |
| JP | 2007519799 A | 7/2007 |
| JP | 2008012382 A | 1/2008 |
| JP | 2008542177 A | 11/2008 |
| JP | 2009505830 A | 2/2009 |
| JP | 2009255014 A | 11/2009 |
| JP | 2010501496 A | 1/2010 |
| JP | 2010099638 A | 5/2010 |
| JP | 2010527769 A | 8/2010 |
| JP | 2011517439 A | 6/2011 |
| JP | 4879574 B2 | 2/2012 |
| JP | 2012153654 A | 8/2012 |
| JP | 2012170951 A | 9/2012 |
| JP | 2012210557 A | 11/2012 |
| JP | 2013255911 A | 12/2013 |
| JP | 2014104428 A | 6/2014 |
| JP | 2014534902 A | 12/2014 |
| JP | 5700376 B2 | 4/2015 |
| JP | 2015165138 A | 9/2015 |
| JP | 2015189586 A | 11/2015 |
| JP | 2016002527 A | 1/2016 |
| JP | 2016064407 A | 4/2016 |
| JP | 2016069318 A | 5/2016 |
| JP | 2016087522 A | 5/2016 |
| JP | 2016529190 A | 9/2016 |
| JP | 2017039218 A | 2/2017 |
| JP | 2017064647 A | 4/2017 |
| JP | 2017509732 A | 4/2017 |
| JP | 2017128480 A | 7/2017 |
| WO | 9745197 A1 | 12/1997 |
| WO | 9745387 A1 | 12/1997 |
| WO | 2005083014 A1 | 9/2005 |
| WO | 2007000847 A1 | 1/2007 |
| WO | 2007023558 A1 | 3/2007 |
| WO | 2009096548 A1 | 8/2009 |
| WO | 2010097108 A1 | 9/2010 |
| WO | 2010097224 A2 | 9/2010 |
| WO | 2011065194 A1 | 6/2011 |
| WO | 2012105581 A1 | 8/2012 |
| WO | 2012170421 A1 | 12/2012 |
| WO | 2013057319 A2 | 4/2013 |
| WO | 2013115213 A1 | 8/2013 |
| WO | 2014083772 A1 | 6/2014 |
| WO | 2014132367 A1 | 9/2014 |
| WO | 2015001123 A1 | 1/2015 |

(56) References Cited

FOREIGN PATENT DOCUMENTS

| WO | 2015155216 A1 | 10/2015 |
|---|---|---|
| WO | 2016014691 A1 | 1/2016 |
| WO | 2016181622 A1 | 11/2016 |
| WO | 2017000427 A1 | 1/2017 |
| WO | 2017072698 A1 | 5/2017 |

OTHER PUBLICATIONS

English translation of International Preliminary Report on Patentability for Application No. PCT/JP2018/021080, dated Dec. 3, 2019.

English translation of Written Opinion for Application No. PCT/JP2018/021080, dated Aug. 21, 2018.

International Search Report (EN translation of ISR only) and Written Opinion for Application No. PCT/JP2018/021080, dated Aug. 21, 2018.

Fujikawa, Takashi, "Current Status and Future Prospects of Petroleum Refining Catalysts", The Nikkan Kogyo Shimbun, Ltd., vol. 65, No. 1, Jan. 1, 2017, p. 22.

Fumoto, Eri et al., "Catalytic Cracking of Heavy Oil With Iron Oxide-Based Catalysts Using Hydrogen and Oxygen Species From Steam", Journal of the Japan Petroleum Institute, vol. 58, No. 5, Feb. 25, 2015, 329-335.

Haruta, Masatake, "Low-Temperature Combustion Catalysts Mainly for Co Oxidation", Journal of The Japan Petroleum Institute, vol. 37, No. 5, Sep. 1, 1994, pp. 480-491.

Ichikawa, Masaru et al., "Advanced Technology of Methane Chemical Conversion", CMC Publishing Co., Ltd., Jan. 2008.

Ismagilov, Z.R. et al., "Structural Changes of MO/ZSM-5 Catalysts During the Ethane Dehydroaromatization", Eurasian Chemico-Technological Journal, Journal 12, Nov. 2009, 9-16.

Laprune, David et al., "Highly Dispersed Nickel Particles Encapsulated in Multi-Hollow SILICALITE-1 Single Crystal Nanoboxes: Effects of Siliceous Deposits and Phosphorous Species on the Catalytic Performances", ChemCatChem, vol. 9, Issue 12, dated Feb. 18, 2017, pp. 2297-2307.

Muroi, Takajyo, "Development Trends of Methane Chemistry Catalysts", Catalyst Round-table Conference News, No. 96, Nov. 1, 2016.

Muroi, Takashiro, "Reverse Water Gas Shift Catalysts", Industrial Catalyst News, No. 107, Aug. 1, 2017, 2 pages.

Sasaki, Makoto et al., "Templating Fabrication of Platinum Nanoparticles and Nanowires Using the Confined Mesoporous Channels of FSM-16—Their Structural Characterization and Catalytic Performances in Water Gas Shift Reaction", Journal of Molecular Catalysis A: Chemical, vol. 141, No. 1/3, May 6, 1999, p. 223-240.

Wu, Zhijie et al., "Hydrothermal Synthesis of LTA-Encapsulated Metal Clusters and Consequences for Catalyst Stability, Reactivity, and Selectivity", Journal of Catalysis, vol. 311, dated Jan. 31, 2014, pp. 458-468.

English Translation of CN 102247887(A).

Wang, D Y. et al., Study on methane aromatization over MoO3/HMCM-49 catalyst, 2004, Catalysis Today, 93-95, Jul. 2, 2004, 75-80.

Office Action for AU Application No. 2018276618, dated May 8, 2020.

English machine translation of JP 2000-511107 A, entitled "Metal-containing zeolite catalyst, its preparation and use for the conversion of hydrocarbons".

English machine translation of JPH0796195 A, entitled "Exhaust Gas Purification Catalyst" dated Sep. 29, 1993.

https://sites.engineering.ucsb.edu/~jbraw/chemreacfun/ch7/slides-masswrxn-2up.pdf, College of Engineering, UC Santa Barbara accessed Apr. 26, 2021.

Dai, Chengyi et al., "Hollow zeolite-encapsulated Fe—Cu bimetallic catalysts for phenol degradation", Catalysis Today, Elsevier, Amsterdam, NL, vol. 297, Feb. 7, 2007 (Feb. 7, 2017), pp. 335-343, XP085215768, ISSN: 0920-5861, DOI: 10.1016/J.CATTOD.2017.02.001.

Li, Shiwen et al., "Diffusion Driven Selectivity in Oxidation of Co in Presence of Propylene Using Zeolite Nano Shell as Membrane", ACS Catalysis, vol. 4, No. 12, Dec. 2014, pp. 4299-4303.

Li, Shiwen et al., "Diffusion-Driven Selectivity in Oxidation of Co in the Presence of Propylene Using Zeolite Nano Shell as Membrane", ACS Catalysis, vol. 4, No. 12, Nov. 2014.

English machine translation of CN 106362787 A, entitled "Preparation method for zeolite-immobilized photocatalyst" dated Feb. 1, 2017.

English machine translation of JP 2002255537 A entitled "Solid Acid Catalyst" dated Sep. 11, 2002.

English machine translation of JP 2005314208 A entitled "Combined Porous Body and Its Manufacturing Method and Organic Substance Converting Method Using the Same" dated Nov. 10, 2005.

English machine translation of JP 2012170951 A entitled "Photocatalyst-Adsorbent Composite Powder" dated Sep. 10, 2012.

English machine translation of JP 2015165138 A entitled "Exhaust Gas Emission Control Device" dated Sep. 17, 2015.

English machine translation of JP 2016069318 A entitled "Storing Method for Secondary Alcohol and Loaded Body" dated May 9, 2016.

English machine translation of JP 2017128480 A entitled "Zeolite Including Metal Particle" dated Jul. 27, 2017.

English machine translation of JP H0549943A entitled "Oxidizing Catalyst" dated Mar. 2, 1993.

English machine translation of JPH1133412 entitled "A Production of Metal-Supporting Catalyst" dated Feb. 9, 1999.

English machine translation of WO 2007/023558 A1 entitled "Tungsten Oxide Photocatalyst, Process for Producing the Same, and Fiber Cloth Having Deodorizing/Antifouling Function" dated Mar. 1, 2007.

English machine translation of WO 2009/096548 A1 entitled "Silver-(Titanium Oxide)-Zeolite Adsorbent/Decomposing Material and Process for Production Thereof" dated Aug. 6, 2009.

English machine translation of WO 2012/105581 A1 entitled "Method for Producing Oxide Semiconductor Layer" dated Sept. 8, 2012.

Extended European Search Report for Application No. 18810207.3, dated Jan. 28, 2021.

Dai, Chengyi et al., "Hollow Zeolite Encapsulated Ni—Pt Bimetals for Sintering and Coking Resistant Dry Reforming of Methane", Journal of Materials Chemistry A, vol. 3, No. 32, Jun. 29, 2015, pp. 16461-16468.

Liu, Xue et al., "Drying of Ni/ALUMINA Catalysts: Control of the Metal Distribution Using Surfacants and the Melt Infiltration Methods", Industrial & Engineering Chemistry Research, vol. 53, No. 14, Apr. 9, 2014, pp. 5792-5800.

Makshina, Ekaterina et al., "Methanol Oxidation on LaCo Mixed Oxide Supported Onto MCM-41 Molecular Sieve", Catalysis Today, vol. 131, No. 1, Nov. 2007, pp. 427-430.

Maneesha, Mishra et al., "[alpha]-Fe2O3 as a photocatalytic material: A review", Applied Catalysis A: General, Elsevier, Amsterdam, NL, vol. 498, Mar. 28, 2015 (Mar. 28, 2015), pp. 126-141, XP029220089, ISSN: 0926-860X, DOI: 10.1016/J.APCATA.2015.03.023.

Wang, Hong et al., "Research into eliminating particulate from diesel engine exhaust over zeolite covered with catalysts of perovskite-type oxides", 2009 International Conference on Energy and Environment Technology : ICEET 2009 ; Guilin, China, Oct. 16-18, 2009, IEEE, Piscataway, NJ, USA, Oct. 16, 2009 (Ict, 16, 2009), pp. 493-495, XP031588294, ISBN: 978-0-7695-3819-8.

Yokoi, Toshiyuki, "Characterization of Zeolites by Advanced SEM/STEM Techniques", The Hitachi Scientific Instrument News, vol. 7, Sep. 2016, pp. 17-23.

Yue, Ming B. et al., "Directly Transforming AS-Synthesized MCM-41 to Mesoporous MFI Zeolite", Journal of Material Chemistry, vol. 18, No. 17, Mar. 13, 2008, p. 2044.

Zhijie, Wu et al., Hydrothermal synthesis of LTA-encapsulated metal clusters and consequences for catalyst stability, reactivity, and selectivity, Journal of Catalysis, Academic Press, Duluth, MN, US,

(56) References Cited

OTHER PUBLICATIONS vol. 311, Jan. 31, 2014 (Jan. 31, 2014), pp. 458-468, XP028612174, ISSN: 0021-9517, DOI: 10.1016/J.JCAT.2013.12.021.
Wen, et al., "Enhanced catalytic performance of Co/MFI by hydrothermal treatment", Catalysis Letters vol. 86, Nos. 1-3, Mar. 2003.
Newsam, J.M., "The Zeolite Cage Structure", Science, Mar. 7, 1986, New Series, vol. 231, No. 2742, pp. 1093-1099 (Year: 1986).
[English Translation] Notice of Reasons for Refusal dated Feb. 7, 2022 for Japanese Patent Application No. 2019-521334.
[English Translation] Notice of Reasons for Refusal dated Feb. 7, 2022 for Japanese Patent Application No. 2019-521335.
[English Translation] Notice of Reasons for Refusal dated Feb. 7, 2022 for Japanese Patent Application No. JP2019-521325.
[English Translation] Notice of Reasons for Refusal dated Mar. 16, 2022 for Japanese Patent Application No. 2019-521331.
[English Translation] Saudi Arabian Office Action dated Jan. 27, 2022 for Saudi Arabian Patent Application No. 519410663.
Do, Trong-On et al., "Zeolite Nanoclusters Coated onto the Mesopore Walls of SBA-15", J. Am. Chem. Soc. vol. 126, No. 44, 2004, pp. 14324-14325.
[English Translation] Notice of Reasons for Refusal dated Mar. 16, 2022 for Japanese Patent Application No. 2019-521322; pp. all.
[English Translation] Notice of Reasons for Refusal dated Mar. 28, 2022 for Japanese Patent Application No. 2019-521324; pp. all.
Cai et al. "Gold Nanoclusters Confined in a Supercage of Y Zeolite for Aerobic Oxidation of HMF under Mild Conditions", Chem. Rur. J, 2013, 19, pp. 14215-14223.
Corma et al. "A zeolite with interconnected 8-, 10-, and 12-ring pores and its unique catalytic selectivity", Nature Materials, vol. 2, Jun. 22, 2003, pp. 493-499.
Corma et al. "ITQ-15: The First ultralarge pore zeolite with a bi-directional pore system formed by intersecting 14- and 12-ring channels, and its catalytic implications", Chem. Commun., May 18, 2004, pp. 1356-1357.
Kalogeras et al. "Electrical Properties of Zeolitic Catalysts", Defect and Diffusion Forum vol. 164, Sep. 1998, pp. 1-36.
Mitra et al. "Molecular dynamics using quasielastic neutron scattering", Current Science, vol. 84, No. 5, Mar. 2003; pp. 653-662.
Nan Jiang et al. "The Adsorption Mechanisms of Organic Micropollutants on High-Silica Zeolites Causing S-Shaped Adsorption Isotherms: an Experimental and Monte Carlo Simulations Study", Chemical Engineering Journal; Nov. 2019; pp. all.
[English Translation] First Office Action dated Apr. 20, 2022 for Chinese Patent Application No. 201880035803.7; pp. all.
[English Translation] Li, Jinlin, et al., "SBA-16 with Different Pore Size Supported Cobal Catalyst for Fischer-Tropsch Synthesis", Journal of South-Central University for Nationalities (National Science Edition); vol. 34 No. 4, Key Laboratory of Catalysis and Materials Science of the State, Ethnic Affairs Commission & Ministry of Education, Dec. 2015; pp. all.
[English Translation] Liu, Quansheng, et al., "Progress in Water-Gas-Shift Catalysts", Progress in Chemistry; vol. 17 No. 3; Institute of Chemical Engineering, Inner Mongolia University of Technology, Hohhot 010062, China, May 2005; pp. all.
[English Translation] First Office Action dated Aug. 3, 2022 for Chinese Patent Application No. 201880035569.8; pp. all.
[English Translation] First Office Action dated Aug. 3, 2022 for Chinese Patent Application No. 201880036313.9; pp. all.
[English Translation] Notice of Reasons for Refusal dated Aug. 16, 2022 for Japanese Patent Application No. 2019-521324; pp. all.
[English Translation] "Preparation and Application of Molecular Sieves", Edited by Shanghai Reagent Factory, Jun. 1976; pp. all.
[English Translation] Notice of Reasons for Refusal dated Jun. 28, 2022 for Japanese Patent Application No. 2019-521318; pp all.
[English Translation] Notice of Reasons for Refusal dated Jun. 28, 2022 for Japanese Patent Application No. 2019-521319; pp. all.
[English Translation] Notice of Reasons for Refusal dated Jun. 28, 2022 for Japanese Patent Application No. 2019-521320; pp. all.
[English Translation] Notice of Reasons for Refusal dated Jun. 28, 2022 for Japanese Patent Application No. 2019-521321; pp. all.
[English Translation] First Office Action dated Jul. 11, 2022 for Chinese Patent Application No. 201880036382.X.
[English Translation] First Office Action dated Jul. 13, 2022 for Chinese Patent Application No. 201880035026.6.
[English Translation] First Office Action dated Jul. 5, 2022 for Chinese Patent Application No. 201880035017.7.
[English Translation] First Office Action dated Jun. 29, 2022 for Chinese Patent Application No. 201880036388.7.
[English Translation] First Office Action dated Jun. 27, 2022 for Chinese Patent Application No. 201880035525.5.
[English Translation] Notice of Reasons for Refusal dated Aug. 3, 2022 for Japanese Patent Application No. 2019-521322.
[English Translation] Notice of Reasons for Refusal dated Aug. 3, 2022 for Japanese Patent Application No. 2019-521331.
[English Translation] The First Office Action dated Jul. 20, 2022 for Chinese Patent Application No. 201880035173.3.
[English Translation] The First Office Action dated Jul. 20, 2022 for Chinese Patent Application No. 201880035360.1.
Dai, Chengyi, et al., "Synthesis of Hollow Nanocubes and Macroporous Monoliths of Silicalite-1 by Alkaline Treatment", Chemistry of Materials, Oct. 7, 2013, pp. 4197-4205.
Hosseinpour, Negahdar, et al., "Cumene cracking activity and enhanced regeneration of FCC catalystscomprising HY-zeolite and LaBO3(B=Co, Mn, and Fe) perovskites", Applied Catalysis A, vol. 487,, Oct. 2014, pp. 26-35.
Laprune, David, et al., "Highly Disperesed Nickel Particles Encapsulated in Multihollow Silicalite-1 Single Crystal Nanoboxes: Effects of Siliceous Deposits and Phosphorous Species on the Catalytic Performances", ChemCatChem, Sep. 2017, pp. 2297-2307.
Liang, Wenping, et al., "Surfactant Applications in Dispersion Systems", China Light Industry Press, Feb. 2003.
Miao, Tao, et al., "Highly dispersed nickel within mesochannels of SBA-15 for CO methanation with enhanced activity and excellent thermostability", Fuel, Journal vol. 188, No. 12; homepage: www.elsevier.com/locate/fuel, 2017, pp. 267-276.
Roque-Malherbe, Rolando M.A., "Adsorption and Diffusion in Nanoporous Materials", Materials Chemistry, Mar. 5, 2007.
[English Translation] First Office Action dated May 16, 2022 for Chinese Patent Application No. 201880036071.3; pp. all.
[English Translation] First Office Action dated May 5, 2022 for Chinese Patent Application No. 201880036312.4; pp. all.
[English Translation] First Office Action dated May 7, 2022 for Chinese Patent Application No. 201880035210.0; pp. all.
[English Translation] Notice of Reasons for Refusal dated Jun. 6, 2022 for Japanese Patent Application No. 2019-521326; pp. all.
First Office Action dated May 6, 2022 for Australian Patent Application No. 2021202968; pp. all.
Dai, Chengyi, et al., "Hollow Zeolite encapsulated Ni—Pt bimetals for sintering and coking resistant dry reforming of methane", Journal of Materials Chemistry A, Jan. 1, 2015, 9 pages.
[Partial English Translation] Zhang, Yicheng, et al., "Advances in the catalysis of methanol to aromatics reaction", Chemical Industry and Engineering Progress, vol. 35 No. 3, Mar. 5, 2016, pp. 801-806.
[English Abstract] Zhang, Lian-Zhong, et al., "Preparation of Phenol and Acetone with Solid Acid Catalyst", [With Chemical World, Mar. 16, 2012, pp. 487-490.
[English Translation] Notice of Reasons for Refusal dated Sep. 27, 2022 for Japanese Patent Application No. 2019-521325; pp. all.
[English Translation] Notice of Reasons for Refusal dated Sep. 27, 2022 for Japanese Patent Application No. 2019-521334, pp. all.
[English Translation] Notice of Reasons for Refusal dated Sep. 27, 2022 for Japanese Patent Application No. 2019-521335, pp. all.
[English Translation] Notice of Reasons for Refusal for Japanese Patent Application No. 2019-521325 dated Sep. 27, 2022, pp. all.
[English Translation] Notice of Reasons for Refusal for Japanese Patent Application No. 2019-521334, dated Sep. 27, 2022, pp. all.
[English Translation] Notice of Reasons for Refusal for Japanese Patent Application No. 2019-521335, dated Sep. 27, 2022, pp. all.
[English Translation] Notice of Reasons for Refusal for Japanese Patent Application No. 2019-521326 dated Nov. 25, 2022, pp. all.

(56) References Cited

OTHER PUBLICATIONS

[English Translation] Second Office Action for Chinese Patent Application No. 201880035803.7 dated Nov. 10, 2022, pp. all.
[English Translation] Second Office Action for Chinese Patent Application No. 201880036312.4 dated Nov. 10, 2022, pp. all.
[English Translation] Zhong, Bangke , "Catalysis i Fine chemical process", Sinopec Press; ISBN 7-80164-251-1, Aug. 2002, 4 pages.
[English Translation] Second Office Action dated Dec. 23, 2022 in CN Application No. 201880035210.0; pp. all.
[English Translation] Second Office Action dated Jan. 5, 2023 in CN Application No. 201880035525.5; pp. all.
Office Action dated Dec. 18, 2022 for SA Application No. 519410677; pp. all.
Office Action dated Dec. 18, 2023 for SA Application No. 519410673; pp. all.
Office Action dated Dec. 26, 2022 for SA Application No. 519410680; pp. all.
Second Office Action dated Jan. 20, 2023 for CN Application No. 201880035360.1; pp. all.
Second Office Action dated Jan. 12, 2023 for CN Application No. 201880036382.X; pp. all.
Second Office Action dated Jan. 19, 2023 for CN Application No. 201880035017.7; pp. all.
Second Office Action dated Jan. 20, 2023 for CN Application No. 201880035026.6, pp. all.
Second Office Action dated Jan. 18, 2023 in CN Application No. 201880036313.9; pp. all.
Decision of Refusal for Japanese Patent Application No. 2019-521318, dated Feb. 1, 2023, pp. all.
Decision of Refusal for Japanese Patent Application No. 2019-521319, dated Feb. 1, 2023, pp. all.
Notice of Reasons for Refusal for Japanese Patent Application No. 2019-521320, dated Feb. 1, 2023, pp, all.
Notice of Reasons for Refusal for Japanese Patent Application No. 2019-521321, dated Feb. 1, 2023, pp. all.
[English Translation] Second Office Action dated Feb. 18, 2023 in CN Application No. 201880035173.3; pp. all.
[English Translation] Second Office Action dated Feb. 24, 2023 in CN Application No. 201880035569.8; pp. all.
[English Translation] Notice of Reasons for Refusal dated Mar. 22, 2023 in JP Application No. 2019-521324; pp. all.
[English Translation] Third Office Action dated Mar. 8, 2023 for CN Application No. 201880035803.7; pp. all.
[English Translation] Third Office Action dated Mar. 8, 2023 in CN Application No. 201880036312.4; pp. all.
[English Translation] Notice of Reasons for Refusal for Japanese Patent Application No. 2019-521322 dated Apr. 4, 2023, pp. all.
[English Translation] Notice of Reasons for Refusal for Japanese Patent Application No. 2019-521325 dated Apr. 4, 2023, pp. all.
[English Translation] Notice of Reasons for Refusal for Japanese Patent Application No. 2019-521331 dated Apr. 4, 2023, pp. all.
[English Translation] Notice of Reasons for Refusal for Japanese Patent Application No. JP-2019-521335 dated Apr. 4, 2023, pp. all.

\* cited by examiner

FUNCTIONAL STRUCTURAL BODY AND METHOD FOR MAKING FUNCTIONAL STRUCTURAL BODY

CROSS REFERENCE TO RELATED APPLICATIONS

The present application is a continuation application of International Patent Application No. PCT/JP2018/021080 filed on May 31, 2018, which claims the benefit of Japanese Patent Application No. 2017-108589, filed on May 31, 2017. The contents of these applications are incorporated herein by reference in their entirety.

TECHNICAL FIELD

The present disclosure relates to a functional structural body including a skeletal body of a porous structure composed of a zeolite-type compound and metal oxide nanoparticles containing perovskite-type oxides, and a method for making the functional structural body.

BACKGROUND ART

In prior art, examples of environmental catalysts for removing exhaust gas such as nitrogen oxides ($NO_x$) and volatile organic substances (VOC) discharged from power plants, automobiles, and the like, include perovskite-type oxides (e.g., Tatsumi Ishihara, "<Special Feature> Current Status of Evolving Catalytic Technology, and Current Status and Prospects of Promising Environmental Catalysts-Smoke Deodorization, VOC, NO Cracking Catalysts-", Engineering Materials, The Nikkan Kogyo Shinbun Ltd., January 2017, Vol. 65, No. 1, p. 71-76).

As environmental catalysts using perovskite-type oxides, for example, Japanese Patent Publication No. JP 11-151440 A describes a cracking catalyst in which a composition of at least one metal complex oxide, which is an active component of a nitrogen oxide cracking catalyst, is represented by a general formula $AB_{1-x}M_xO_{3+z}$ (where A is a metal selected from alkaline earth elements, B is a metal selected from titanium group elements, M is a metal selected from iron group, platinum group, or copper group elements, $0<x<1$, and z is the number of oxygen defects or oxygen excess at normal temperature and atmospheric pressure), and at least one metal complex oxide, which is a catalytic active component, has a $SrTiO_3$ perovskite-type crystal structure, and Japanese Patent Publication No. JP 2000-197822 A describes a nitrogen oxide cracking catalyst in which a metal complex oxide having such a perovskite crystal structure is supported on a support of a basic metal oxide (e.g., MgO).

However, the raw material powder of the perovskite-type oxide tends to aggregate easily by heat during calcination (approximately 600 to 1000° C.), hence the aggregation causes blockage of the pores, thereby reducing the specific surface area of the catalyst and decreasing adsorption and decomposition performance thereof. Additionally, catalysts containing perovskite-type oxides are activated at high temperatures, hence exhibit relatively high catalytic performance at temperatures 800° C. or higher, but exhibit little catalytic performance at temperatures at 650° C. or below. Note that the "catalytic performance" refers to, for example, the adsorption performance of nitrogen oxides.

A prior art technology that allows suppression of aggregation of perovskite-type oxides that tend to be caused by the influence of heat generated during calcination or high-temperature use is described in, for example, Japanese Patent Publication No. JP 2010-99638 A. Japanese Patent Publication No. JP 2010-99638 A describes that a catalyst is composed of a perovskite-type complex oxide, a complex oxide spacer, and a noble metal, and the inclusion of the complex oxide spacer suppresses aggregation of the perovskite-type complex oxide molecules and blockage of pores caused by aggregation, and this increases the specific surface area calculated by the BET method, and with the catalyst being produced in the form of powder, the use of this powdery catalyst (catalytic nanoparticles) increases the specific surface area of the catalyst.

However, Japanese Patent Publication No. JP 2010-99638 A does not disclose a catalyst for usage in which catalyst nanoparticles are held (supported) on a skeletal body (support). When the catalyst nanoparticles having the configuration described above are held in a skeletal body, the inclusion of the catalytic nanoparticles in the skeletal body is usually difficult, and only a configuration where the catalytic nanoparticles are held (adhered) on the outer surface of the skeletal body is realized. However, this configuration leads to the problem whereby the catalyst nanoparticles are prone to aggregation (sintering) due to influences (effects) such as force (pressure) or heat from exhaust gas (fluid) such as nitrogen oxide.

SUMMARY OF DISCLOSURE

Technical Problem

An object of the present disclosure is to provide a functional structural body that exhibits a stable function for a long period of time suppressing aggregation of metal oxide nanoparticles and preventing the decline of a function of metal oxide nanoparticles by adopting a configuration in which metal oxide nanoparticles having a function (e.g., a catalytic function) are included to be appropriately present in a skeletal body having a porous structure composed of a zeolite-type compound.

Solution to Problem

As a result of intensive research to achieve the object described above, the present inventors have found that a functional structural body that can suppress the decline of a function of the metal oxide nanoparticles (e.g., a catalytic function) and that can realize a long life time can be obtained by including in the structural body: a skeletal body of a porous structure composed of a zeolite-type compound; and at least one type of metal oxide nanoparticles present in the skeletal body, wherein the skeletal body has channels connecting with each other, and the metal oxide nanoparticles are present at least in the channels of the skeletal body, and thus completed the present disclosure based on such finding.

In other words, the summary configurations of the present disclosure are as follows.

[1] A functional structural body, including:
a skeletal body of a porous structure composed of a zeolite-type compound; and
at least one type of metal oxide nanoparticles containing a perovskite-type oxide present in the skeletal body,
in which the skeletal body has channels connecting with each other, and
in which the metal oxide nanoparticles are present at least in the channels of the skeletal body.

[2] The functional structural body according to [1], in which the channels have any one of a one-dimensional pore, a two-dimensional pore, and a three-dimensional pore defined by the framework of the zeolite-type compound and an enlarged pore portion with a diameter different from that of any of the one-dimensional pore, the two-dimensional pore, and the three-dimensional pore, and in which the metal oxide nanoparticles are present at least in the enlarged pore portion.

[3] The functional structural body according to [2], in which the enlarged pore portion makes a plurality of pores, which constitute any one of the one-dimensional pore, the two-dimensional pore, and the three-dimensional pore, connect with one another.

[4] The functional structural body according to [2], in which an average particle size of the metal oxide nanoparticles is greater than an average inner diameter of the channels and is less than or equal to the inner diameter of the enlarged pore portion.

[5] The functional structural body according to [1],
in which the metal oxide nanoparticles are a catalytic substance, and in which the skeletal body is a support that supports at least one catalytic substance.

[6] The functional structural body according to [1], in which a metal element (M) of the metal oxide nanoparticles is contained in an amount of 0.5 mass % to 2.5 mass % based on the functional structural body.

[7] The functional structural body according to [1], in which the average particle size of the metal oxide nanoparticles is from 0.1 nm to 50 nm.

[8] The functional structural body according to [1], in which a ratio of the average particle size of the metal oxide nanoparticles to an average inner diameter of the channels is from 0.06 to 500.

[9] The functional structural body according to [8], in which the ratio of the average particle size of the metal oxide nanoparticles to the average inner diameter of the channels is from 0.1 to 45.

[10] The functional structural body according to [9], in which the ratio of the average particle size of the metal oxide nanoparticles to the average inner diameter of the channels is from 1.7 to 4.5.

[11] The functional structural body according to [2], in which the channels have any one of a one-dimensional pore, a two-dimensional pore, and a three-dimensional pore defined by the framework of the zeolite-type compound and an enlarged pore portion with a diameter different from that of any of the one-dimensional pore, the two-dimensional pore, and the three-dimensional pore, the average inner diameter of the channels is from 0.1 nm to 1.5 nm, and the inner diameter of the enlarged pore portion is from 0.5 nm to 50 nm.

[12] The functional structural body according to [1], further including at least one type of other metal oxide nanoparticles held on an outer surface of the skeletal body.

[13] The functional structural body according to [12], in which the content of the at least one type of metal oxide nanoparticles present in the skeletal body is greater than that of the at least one type of other metal oxide nanoparticles held on the outer surface of the skeletal body.

[14] The functional structural body according to [1], in which the zeolite-type compound is a silicate compound.

[15] A method for making a functional structural body, including:

a calcination step of calcining a precursor material (B) obtained by impregnating a precursor material (A) for obtaining a skeletal body of a porous structure composed of a zeolite-type compound with a metal-containing solution containing at least one element selected from rare earth elements and alkaline earth metals, and at least one element selected from transition metals as a metal element (M), and a hydrothermal treatment step of hydrothermal-treating a precursor material (C) obtained by calcining the precursor material (B).

[16] The method for making a functional structural body according to [15], in which 50 to 500 mass % of a non-ionic surfactant is added to the precursor material (A) before the calcination step.

[17] The method for making a functional structural body according to [15], in which the precursor material (A) is impregnated with the metal-containing solution by adding the metal-containing solution to the precursor material (A) one at a time before the calcination step.

[18] The method for making a functional structural body according to [15], in which when impregnating the precursor material (A) with the metal-containing solution before the calcination step, an amount of the metal-containing solution to be added to the precursor material (A) is adjusted to 10 to 1,000 in terms of a ratio of silicon (Si) constituting the precursor material (A) to a metal element (M) included in the metal-containing solution to be added to the precursor material (A) (a ratio of number of atoms Si/M).

[19] The method for making the functional structural body according to [15], in which in the hydrothermal treatment step, the precursor material (C) and a structure directing agent are mixed.

[20] The method for making a functional structural body according to [15], in which the hydrothermal treatment step is performed in a basic condition.

Advantageous Effects of Disclosure

The present disclosure provides a functional structural body that can realize a long life time by suppressing aggregation of metal oxide nanoparticles and the decline of a function of metal oxide nanoparticles (e.g., a catalytic function) and that can save resources without requiring a complicated replacement operation.

BRIEF DESCRIPTION OF DRAWINGS

FIG. 1A is a perspective view (partially shown in cross-section), and FIG. 1B is a partially enlarged cross-sectional view.

FIG. 2A is a diagram illustrating a function of a sieve, and FIG. 2B is a diagram explaining a catalytic function.

DETAILED DESCRIPTION OF THE DISCLOSURE

Figure 1A:
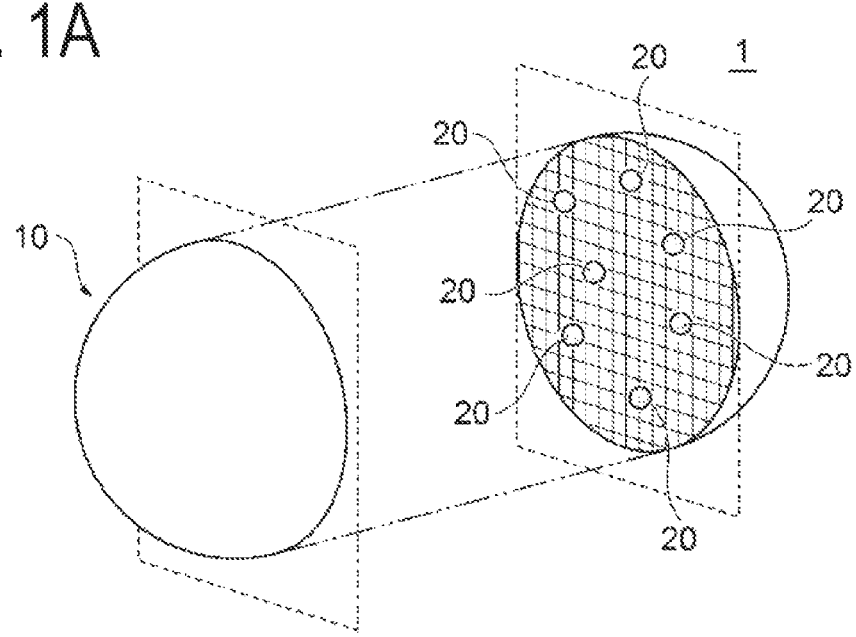
FIGS. 1A and 1B are diagrams schematically illustrating a functional structural body according to an embodiment of the present disclosure so that an inner structure thereof can be understood.
Figure 1B:
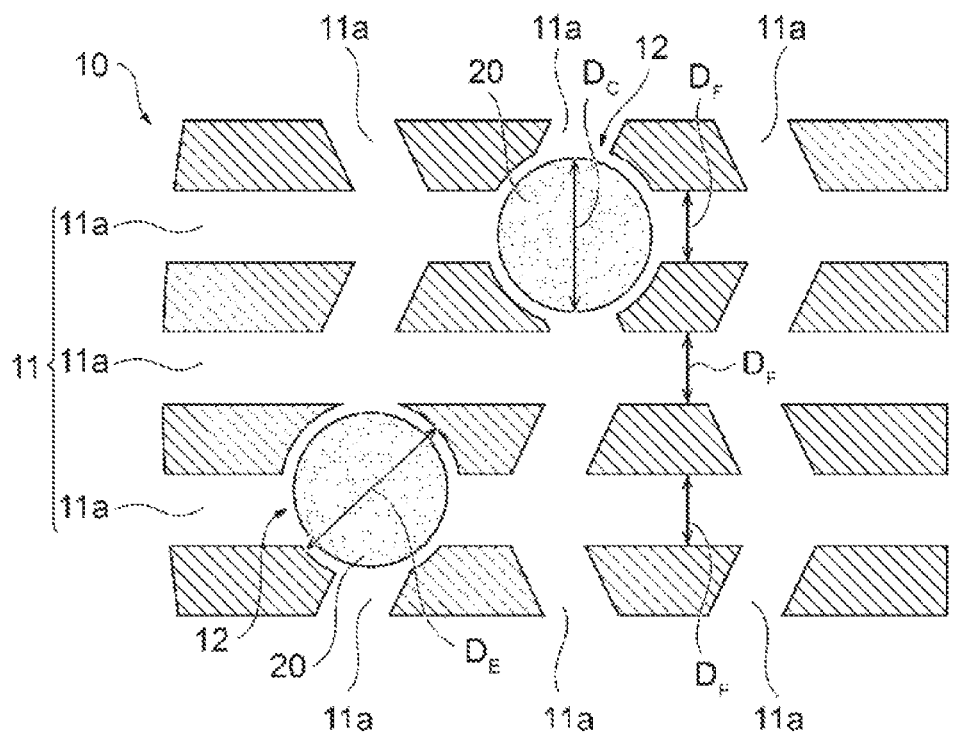

Hereinafter, embodiments of the present disclosure will be described in detail with reference to the drawings.
[Configuration of Functional Structural Body]
FIGS. 1A and 1B are diagrams schematically illustrating a configuration of a functional structural body according to an embodiment of the present disclosure. FIG. 1A is a perspective view (partially shown in cross-section), and FIG. 1B is a partially enlarged cross-sectional view. Note that the functional structural body in FIGS. 1A and 1B is an example of the functional structural body, and the shape, dimension, and the like of each of the configurations according to the present disclosure are not limited to those illustrated in FIGS. 1A and 1B.

As shown in FIG. 1A, a functional structural body 1 includes a skeletal body 10 of a porous structure composed of a zeolite-type compound, and at least one type of metal oxide nanoparticles 20 containing perovskite-type oxides present in the skeletal body 10.

The metal oxide nanoparticles 20 are substances that exhibit one or more functions by themselves, or in cooperation with the skeletal body 10. Specific examples of the functions described above include a catalytic function, a light emission (or fluorescent) function, a light-absorbing function, and an identification function. The metal oxide nanoparticles 20 are preferably, for example, catalytic substances having a catalytic function. When the metal oxide nanoparticles 20 are catalytic substances, the skeletal body 10 is a support that supports at least one catalytic substance.

In the functional structural body 1, at least one metal oxide nanoparticle 20 (in FIG. 1B, a plurality of metal oxide nanoparticles 20, 20, . . . ) is present inside the porous structure of the scaffold 10. The metal oxide nanoparticles 20 are metal oxide nanoparticles containing one or more types of perovskite-type oxides. The perovskite-type oxide is described in detail later.

The skeletal body 10 is a porous structure, and as illustrated in FIG. 1B, a plurality of pores 11a, 11a, . . . are preferably formed so as to have channels 11 that connect with each other. Here, the metal oxide nanoparticles 20 are present at least in the channel 11 of the skeletal body 10, and are preferably held at least in the channel 11 of the skeletal body 10.

With such a configuration, movement of the metal oxide nanoparticles 20 within the skeletal body 10 is restricted, and aggregation between the metal oxide nanoparticles 20, 20 is effectively prevented. As a result, the decrease in effective surface area of the metal oxide nanoparticles 20 can be effectively suppressed, and the function of the metal oxide nanoparticles 20 lasts for a long period of time. In other words, with the functional structural body 1, the decline of the function due to aggregation of the metal oxide nanoparticles 20 can be suppressed, and the life time of the functional structural body 1 can be extended. In addition, due to the longer life time of the functional structural body 1, the replacement frequency of the functional structural body 1 can be reduced, and a disposal volume of the used functional structural body 1 can be significantly reduced, whereby resource saving can be achieved.

Typically, when the functional structural body is used in a fluid (e.g., a nitrogen oxide (NOx) or a volatile organic component (VOC)), the functional structural body may receive external force from the fluid. In this case, when the metal oxide nanoparticles 20 are only held in a state of attaching to the outer surface of the skeletal body 10, a problem arises in which the nanoparticles easily detach from the outer surface of the skeletal body 10 due to the influence of external force from the fluid. In contrast, in the functional structural body 1, the metal oxide nanoparticles 20 are present at least in the channel 11 of the skeletal body 10 or preferably held therein, therefore, even if the metal oxide nanoparticles 20 receive external force caused by a fluid, the metal oxide nanoparticles 20 are less likely to detach from the skeletal body 10. That is, it is considered that, when the functional structural body 1 is in the fluid, the fluid flows into the channel 11 from a pore 11a of the skeletal body 10, hence the speed of the fluid flowing through the channel 11 is slower than the speed of the fluid flowing on the outer surface of the skeletal body 10 due to flow path resistance (frictional force). Due to the influence of such flow path resistance, the pressure that the metal oxide nanoparticles 20 held in the channel 11 receives from the fluid is lower than the pressure that the metal oxide nanoparticles receive from the fluid outside the skeletal body 10. As a result, detachment of the metal oxide nanoparticles 20 present in the skeletal body 11 can be effectively suppressed, and the function of the metal oxide nanoparticles 20 can be stably maintained over a long period of time. Note that it is considered that the flow path resistance as described above is larger when the channel 11 of the skeletal body 10 has a plurality of bends and branches and moreover the interior of the skeletal body 10 has a more complex three-dimensional structure.

Preferably, the channel 11 has any one of a one-dimensional pore, a two-dimensional pore, and a three-dimensional pore defined by the framework of the zeolite-type compound, and an enlarged pore portion 12 which has a diameter different from that of any of the one-dimensional pore, the two-dimensional pore, and the three-dimensional pore. In this case, the metal oxide nanoparticles 20 are preferably present at least in the respective enlarged pore portions 12. More preferably, the metal oxide nanoparticles 20 are embedded at least in the respective enlarged pore portions 12. Here, the "one-dimensional pore" refers to a tunnel-type or cage-type pore forming a one-dimensional channel, or a plurality of tunnel-type or cage-type pores (a plurality of one-dimensional channels) forming a plurality of one-dimensional channels. Also, the "two-dimensional pore" refers to a two-dimensional channel in which a plurality of one-dimensional channels are connected two-dimensionally. The "three-dimensional pore" refers to a three-dimensional channel in which a plurality of one-dimensional channels are connected three-dimensionally.

As a result, the movement of the metal oxide nanoparticles 20 within the skeletal body 10 is further restricted, whereby detachment of the metal oxide nanoparticles 20 and aggregation between the metal oxide nanoparticles 20, 20 are effectively prevented. The wording "embedding" refers to a state in which the metal oxide nanoparticles 20 are included in the skeletal body 10. At this time, the metal oxide nanoparticles 20 and the skeletal body 10 need not necessarily be in direct contact with each other, but the metal oxide nanoparticles 20 may be indirectly held by the skeletal body 10, with another substance (e.g., a surfactant, etc.) being interposed between the metal oxide nanoparticles 20 and the skeletal body 10.

FIG. 1B illustrates the case in which the metal oxide nanoparticles 20 are embedded in the enlarged pore portion 12, but the configuration is not limited to this, and the metal oxide nanoparticles 20 may be held in the channel, 11 with a portion thereof protruding outward from the enlarged pore portion 12. Furthermore, the metal oxide nanoparticles 20 may be partially embedded in a portion of the channel 11 other than the enlarged pore portion 12 (for example, in an inner wall portion of the channel 11), or may be held by fixing, for example.

Additionally, the enlarged pore portion 12 preferably make the plurality of pores 11a, 11a, which constitute any one of the one-dimensional pore, the two-dimensional pore, and the three-dimensional pore, connect with one another.

As a result, a separate channel that differs from the one-dimensional pore, the two-dimensional pore, or the three-dimensional pore is provided in the interior of the skeletal body 10, hence the function of the metal oxide nanoparticle 20 can be further exhibited.

Additionally, the channel 11 is formed three-dimensionally by including a branch portion or a merging portion within the skeletal body 10, and the enlarged pore portion 12 is preferably provided in the branch portion or the merging portion of the channel 11.

The average inner diameter $D_F$ of the channel 11 formed in the skeletal body 10 is calculated from an average value of short diameters and long diameters of the pores 11a constituting any of the one-dimensional pore, the two-dimensional pore, and the three-dimensional pore. For example, the value is from 0.1 nm to 1.5 nm, and preferably from 0.5 nm to 0.8 nm. The inner diameter $D_E$ of the enlarged pore portion 12 is from 0.5 nm to 50 nm, for example, and is preferably from 1.1 nm to 40 nm, and more preferably from 1.1 nm to 3.3 nm. For example, the inner diameter $D_E$ of the enlarged pore portion 12 depends on the pore diameter of a precursor material (A) described later and the average particle size $D_C$ of the metal oxide nanoparticles 20 to be embedded. The inner diameter $D_E$ of the enlarged pore portion 12 is sized allowing the enlarged pore portion 12 to embed the metal oxide nanoparticles 20.

The skeletal body 10 is composed of a zeolite-type compound. Examples of zeolite-type compounds include zeolite analog compounds, such as zeolites (alminosilicate salts), cation exchanged zeolites, silicate compounds such as silicalite, alminoborate salts, alminoarsenate salts, and germanate salts; and phosphate-based zeolite analog materials, such as molybdenum phosphate. Among these, the zeolite-type compound is preferably a silicate compound.

The framework of the zeolite-type compound is selected from FAU type (Y type or X type), MTW type, MFI type (ZSM-5), FER type (ferrierite), LTA type (A type), MWW type (MCM-22), MOR type (mordenite), LTL type (L type), and BEA type (beta type). Preferably, it is MFI type, and more preferably ZSM-5. A plurality of pores having a pore diameter corresponding to each framework is formed in the zeolite-type compound. For example, the maximum pore diameter of MFI type is 0.636 nm (6.36 Å) and the average pore diameter is 0.560 nm (5.60 Å).

The metal oxide nanoparticles 20 may be primary particles or secondary particles formed by aggregating primary particles, but the average particle size $D_C$ of the metal oxide nanoparticles 20 is preferably larger than the average inner diameter $D_F$ of the channel 11 and not greater than the inner diameter $D_E$ of the enlarged pore portion 12 ($D_F<D_C\leq D_E$). Such metal oxide nanoparticles 20 are suitably embedded in the enlarged pore portion 12 within the channel 11, and the movement of the metal oxide nanoparticles 20 within the skeletal body 10 is restricted. Thus, even if the metal oxide nanoparticles 20 receive external force from the fluid, movement of the metal oxide nanoparticles 20 within the skeletal body 10 is suppressed, and this effectively prevents the metal oxide nanoparticles 20, 20, . . . embedded respectively in the enlarged pore portions 12, 12, . . . dispersed in the channel 11 of the skeletal body 10, from contacting and aggregating with one another.

In both a case where the metal oxide nanoparticles 20 are primary particles and a case where the metal oxide nanoparticles 20 are secondary particles, the average particle size $D_C$ thereof is preferably from 0.1 nm to 50 nm, more preferably 0.1 nm or higher and less than 30 nm, and still more preferably from 0.5 nm to 14.0 nm, and particularly preferably from 1.0 nm to 3.3 nm. Furthermore, a ratio ($D_C/D_F$) of the average particle size $D_C$ of the metal oxide nanoparticles 20 to the average inner diameter $D_F$ of the channel 11 is preferably from 0.06 to 500, more preferably from 0.1 to 4.5, still more preferably from 1.1 to 45, and particularly preferably from 1.7 to 4.5.

The metal element (M) of the metal oxide nanoparticles is preferably contained in an amount of 0.5 to 2.5 mass % relative to the functional structural body 1, and more preferably from 0.5 to 1.5 mass % relative to the functional structural body 1. Note that "metal element (m)" here refers to all of the metals contained in the oxide in perovskite-type oxides containing a plurality of types of metals as described below, and the content refers to the total amount thereof. For example, when the metal element (M) is La and Mn, the content of the metal element (mass %) is expressed as {(mass of La element+mass of Mn element)/(mass of all elements of the functional structural body 1)}×100.

Perovskite-type oxides are $ABO_3$ type compounds composed of a metal ion with a large ion radius (>0.90 Å) (ion A) such as rare earth alkaline earth and a metal ion with a small ion radius (>0.51 Å) (ion B). Perovskite, which is important as a catalyst, is a compound based on a combination of a rare earth element (A-site) and a transition metal (B-site), the catalytic properties of which depend primarily on the properties of the B-site transition metal.

The perovskite catalyst species to be included is not particularly limited as long as the species is a compound that satisfies the general formula $ABO_3$ of perovskite (A: at least one element selected from rare earth elements and alkaline earth metals, B: at least one type selected from transition metals), and is a compound having catalytic activity. Specific examples include $LaBO_3$ (B=Mn, Cr, Co, Fe, Al, Al, Pd, or Mg), $BaZrO_3$, $La_{0.8}Sr_{0.2}Ga_{0.8}Mg_{0.2}O_3$ (LSGM), $LaFe_{0.57}Co_{0.38}Pd_{0.05}O_3$, and $Ba_{0.8}La_{0.2}Mn_{0.2}O_3$.

Furthermore, it is sufficient that the metal oxide nanoparticles 20 contain perovskite-type oxides, and, for example, may be constituted by a single perovskite-type oxide, or may be constituted by a complex oxide formed from two or more types of perovskite-type oxide, or a complex oxide composed of perovskite-type oxide and other oxides. Furthermore, a ratio of silicon (Si) constituting the skeletal body 10 to the metal element (M) constituting the metal oxide nanoparticles 20 (the ratio of number of atoms, Si/M) is preferably from 10 to 1,000. When the presence ratio is greater than 1000, the activity is low, and sufficient catalytic action may not be obtained. On the other hand, if the presence ratio is less than 10, the presence ratio of the perovskite catalyst becomes too large, and the strength of the skeletal body tends to decrease. Note that, here, the metal oxide nanoparticles 20 are those present and are preferably retained or supported in the interior of the skeletal body 10, and do not include nanoparticles adhered to the outer surface of the skeletal body 10.

Examples of other metal oxides include complex metal oxides composed mainly of one or more of cobalt oxide (CoOx), nickel oxide (NiOx), iron oxide (FeOx), copper oxide (CuOx), zirconium oxide (ZrOx), cerium oxide (CeOx), aluminum oxide (AlOx), niobium oxide (NbOx), titanium oxide (TiOx), bismuth oxide (BiOx), molybdenum oxide (MoOx), vanadium oxide (VOx), and chromium oxide (CrOx).

[Function of Functional Structural Body]

The functional structural body 1 includes the skeletal body 10 of a porous structure and at least one type of metal oxide nanoparticles 20 present in the skeletal body 10, as described above. The functional structural body 1 exhibits a function depending on the metal oxide nanoparticles 20, with the metal oxide nanoparticles 20 present in the skeletal body being brought into contact with a fluid. Specifically, the fluid in contact with the outer surface 10a of the functional structural body 1 flows into the skeletal body 10 through the pore 11a formed in the outer surface 10a and guided into the channel 11, moves through the channel 11, and exits to the exterior of the functional structural body 1 through the other pore 11a. In a pathway through which the fluid travels through the channel 11, contact with the metal oxide nanoparticles 20 that is held in the channel 11 results in a reaction (e.g., a catalytic reaction), depending on the function of the metal oxide nanoparticles 20. In addition, the functional structural body 1 has molecular sieving capability due to the skeletal body being a porous structure.

Figure 2A:
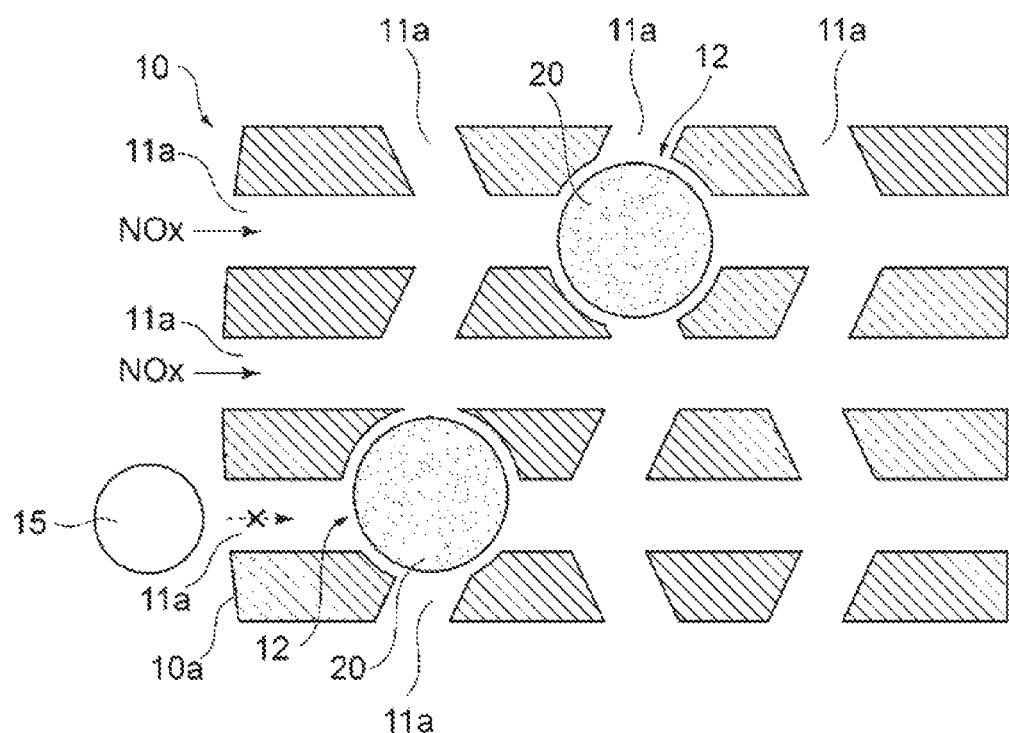
FIGS. 2A and 2B are a partially enlarged cross-sectional view for explaining an example of a function of the functional structural body of FIGS. 1A and 1B.

First, description is provided about the molecular sieving capability of the functional structural body 1, by using a case, in which the fluid is, for example, an exhaust gas containing a nitrogen oxide (NOx), as an example with reference to FIG. 2A. As illustrated in FIG. 2A, an exhaust gas component (e.g., a nitrogen oxide (NOx) component) constituted of molecules having a size that is less than or equal to the pore diameter of the pore 11a, in other words, less than or equal to the inner diameter of the channel 11, can enter the skeletal body 10. On the other hand, an exhaust gas component 15 constituted of molecules having a size exceeding the pore diameter of the pore 11a cannot enter the skeletal body 10. In this way, when the fluid contains a plurality of types of exhaust gas components, the reaction of the exhaust gas component 15 that cannot enter the skeletal body 10 is restricted and an exhaust gas component (e.g., a nitrogen oxide (NOx) capable of entering the skeletal body 10 component) can be reacted.

Of the molecules produced in the skeletal body 10 by the reaction, only the molecules having a size less than or equal to the pore diameter of the pore 11a can be obtained as reaction products. On the other hand, the molecules that cannot exit to the exterior of the skeletal body 10 from the pore 11a can be released to the exterior of the skeletal body 10 after being converted to molecules of a size able to exit to the exterior of the skeletal body 10. In this way, a specified reaction product can be selectively obtained by using the functional structural body 1.

Figure 2B:
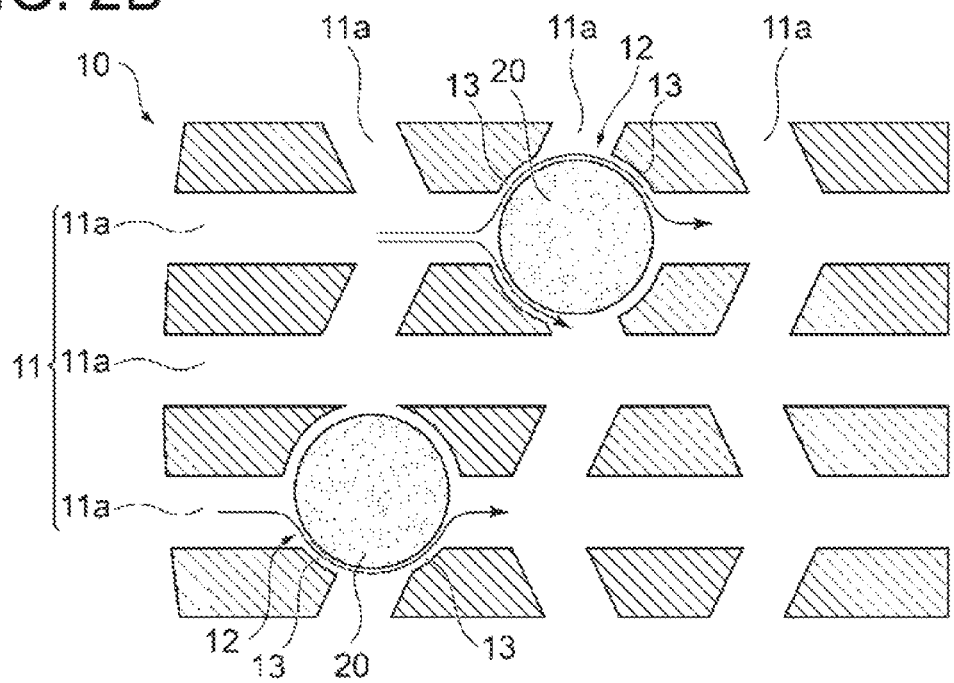

In the functional structural body 1, as illustrated in FIG. 2B, the metal oxide nanoparticles 20 are suitably present and, more preferably, embedded in the enlarged pore portion 12 of the channel 11. When the average particle size $D_C$ of the metal oxide nanoparticles 20 is larger than the average inner diameter $D_F$ of the channel 11 and smaller than the inner diameter $D_E$ of the enlarged pore portion 12 ($D_F<D_C<D_E$), a small channel 13 is formed between the metal oxide nanoparticles 20 and the enlarged pore portion 12. Thus, as indicated by arrow in FIG. 2B, the fluid (such as NOx component) that has entered the small channel 13 comes into contact with the metal oxide nanoparticles 20. Because the metal oxide nanoparticles 20 are embedded in the enlarged pore portion 12, movement within the skeletal body 10 is restricted, whereby area of contact with the fluid containing NOx and other components that have entered into the channel 11 is maintained.

Then, when NOx that has entered the channel 11 contacts the metal oxide nanoparticles 20, it is possible to decompose and remove the nitrogen oxide (NOx) by a reduction decomposition reaction of the metal oxide nanoparticles 20.

$$2NO+2Vo+4e \rightarrow 2N_{ad}+2O_L^{2-}$$

$$2N_{ad} \rightarrow N_2$$

$$2O_L^{2-} \rightarrow O_2+2Vo+4e$$

($O_L^{2-}$ is a lattice oxygen, and Vo is oxygen defect)

The metal oxide nanoparticles 20 can, as described below, decompose the VOC component ($C_yH_z$) into carbon dioxide and water to be removed.

$$C_yH_z+(y+z/4)O_2 \rightarrow yCO_2+z/2H_2O$$

[Method for Making Functional Structural Body]

Figure 3:
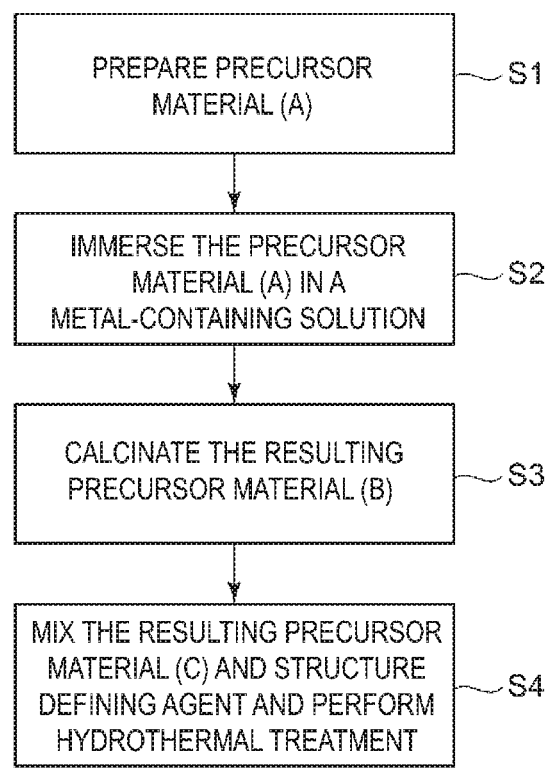
FIG. 3 is a flowchart illustrating an example of a method for making the functional structural body of FIGS. 1A and 1B.

FIG. 3 is a flowchart illustrating a method for making the functional structural body 1 of FIGS. 1A and 1B. An example of the method for making a functional structural body is described below.

(Step S1: Preparation Step)

As shown in FIG. 3, the precursor material (A) is first prepared for obtaining the skeletal body of the porous structure composed of the zeolite-type compound. The precursor material (A) is preferably a regular mesopore material, and can be appropriately selected according to the type (composition) of the zeolite-type compound constituting the skeletal body of the functional structural body.

Here, when the zeolite-type compound constituting the skeletal body of the functional structural body is a silicate compound, the regular mesopore material is preferably a compound including a Si—O skeletal body in which pores having a pore diameter of 1 to 50 nm are uniformly sized and regularly developed one-dimensionally, two-dimensionally, or three-dimensionally. While such a regular mesopore material is obtained as a variety of synthetic materials depending on the synthetic conditions. Specific examples of the synthetic material include SBA-1, SBA-15, SBA-16, KIT-6, FSM-16, and MCM-41. Among them, MCM-41 is preferred. Note that the pore diameter of SBA-1 is from 10 to 30 nm, the pore diameter of SBA-15 is from 6 to 10 nm, the pore diameter of SBA-16 is 6 nm, the pore diameter of KIT-6 is 9 nm, the pore diameter of FSM-16 is from 3 to 5 nm, and the pore diameter of MCM-41 is from 1 to 10 nm. Examples of such a regular mesopore material include mesoporous silica, mesoporous aluminosilicate, and mesoporous metallosilicate.

The precursor material (A) may be a commercially available product or a synthetic product. When the precursor material (A) is synthesized, it can be synthesized by a known method for synthesizing a regular mesopore material. For example, a mixed solvent including a raw material containing the constituent elements of the precursor material (A) and a molding agent for defining the structure of the precursor material (A) is prepared, and the pH is adjusted as necessary to perform hydrothermal treatment (hydrothermal synthesis). Thereafter, the precipitate (product) obtained by hydrothermal treatment is recovered (e.g., filtered), washed and dried as necessary, and then calcined to obtain a precursor material (A) which is a powdered regular mesopore material. Here, examples of the solvent of the mixed solvent that can be used include water, an organic solvent such as alcohol, or a mixed solvent thereof. In addition, the raw material is selected according to the type of the skeletal body, but examples include silica agents such as tetraethoxysilane (TEOS), fumed silica, and quartz sand. In addition, various types of surfactants, block copolymers, and the like can be used as the molding agent, and it is preferably selected depending on the type of the synthetic materials of the regular mesopore material. For example, a surfactant such as hexadecyltrimethylammonium bromide is preferable when producing MCM-41. The hydrothermal treatment can be performed at 0 to 2,000 kPa at 80 to 800° C. for 5 hours to 240 hours in a sealed container. For example, the calcination treatment can be performed in air, at 350 to 850° C. for 2 hours to 30 hours.

(Step 2: Impregnating Step)

The prepared precursor material (A) is then impregnated with the metal-containing solution to obtain the precursor material (B).

The metal-containing solution may be a solution containing at least one element selected from rare earth elements and alkaline earth metals and at least one element selected from transition metals as the metal element (M), and can be prepared, for example, by dissolving a metal salt containing the metal element (M) in a solvent. Examples of such metal salts include metal salts such as chlorides, hydroxides, oxides, sulfates, and nitrates. Of these, nitrates are preferable. Examples of the solvent that can be used include water, an organic solvent such as alcohol, or a mixed solvent thereof.

The method for impregnating the precursor material (A) with the metal-containing solution is not particularly limited; however, for example, the metal-containing solution is preferably added in portions a plurality of times while mixing the powdered precursor material (A) before the calcination step described below. In addition, the surfactant is preferably added to the precursor material (A) as the additive before adding the metal-containing solution to the precursor material (A) from the perspective of allowing the metal-containing solution to enter the pores of the precursor material (A) more easily. It is believed that such additives serve to cover the outer surface of the precursor material (A) and inhibit the subsequently added metal-containing solution from adhering to the outer surface of the precursor material (A), making it easier for the metal-containing solution to enter the pores of the precursor material (A).

Examples of such additives include non-ionic surfactants such as polyoxyethylene oleyl ether, polyoxyethylene alkyl ether, and polyoxyethylene alkylphenyl ether. It is believed that these surfactants do not adhere to the interior of the pores because their molecular size is large and cannot enter the pores of the precursor material (A), and will not interfere with the penetration of the metal-containing solution into the pores. As the method for adding the non-ionic surfactant, for example, it is preferable to add from 50 to 500 mass % of the non-ionic surfactant to the precursor material (A) prior to the calcination step described below. If the added amount of the non-ionic surfactant to the precursor material (A) is less than 50 mass %, the aforementioned suppressing action will not easily occur, and when more than 500 mass % of the non-ionic surfactant is added to the precursor material (A), the viscosity is too high, which is not preferable. Thus, the added amount of the non-ionic surfactant to the precursor material (A) is a value within the range described above.

Furthermore, the added amount of the metal-containing solution added to the precursor material (A) is preferably adjusted as appropriate in consideration of the amount of the metal element (M) contained in the metal-containing solution with which the precursor material (A) is impregnated (that is, the amount of the metal element (M) present in the precursor material (B)). For example, prior to the calcination step described below, the value obtained by converting the added amount of the metal-containing solution added to the precursor material (A) to a ratio of silicon (Si) constituting the precursor material (A) to a metal element (M) included in the metal-containing solution added to the precursor material (A) (the ratio of number of atoms Si/M) is preferably adjusted to 10 to 1,000, and more preferably 50 to 200. For example, if the surfactant is added to the precursor material (A) as the additive prior to adding the metal-containing solution to the precursor material (A), when the value obtained by converting the added amount of the metal-containing solution added to the precursor material (A) to the ratio of number of atoms Si/M is from 50 to 200, 0.5 to 2.5 mass % of the metal element (M) of the metal oxide nanoparticles can be included in the functional structural body. In the state of the precursor material (B), the amount of the metal element (M) present within the pores is generally proportional to the added amount of the metal-containing solution added to the precursor material (A) if the metal concentration of the metal-containing solution, the presence or absence of additives, and other conditions such as temperature, pressure, and the like are the same. The amount of metal element (M) present in the precursor material (B) is also in a proportional relationship to the amount of metal element constituting the metal oxide nanoparticles embedded in the skeletal body of the functional structural body. Thus, by controlling the added amount of the metal-containing solution added to the precursor material (A) to the range described above, the pores of the precursor material (A) can be sufficiently impregnated with the metal-containing solution, and thus the amount of metal oxide nanoparticles present in the skeletal body of the functional structural body can be adjusted.

After impregnating the precursor material (A) with the metal-containing solution, a washing treatment may be performed as necessary. Examples of the solvent of the washing solution that can be used include water, an organic solvent such as alcohol, or a mixed solvent thereof. Furthermore, the precursor material (A) is preferably impregnated with the metal-containing solution, and after the washing treatment is performed as necessary, the precursor material (A) is further subjected to drying treatment. Drying treatments include overnight natural drying and high temperature drying at 150° C. or lower. Note that when calcination treatment described below is performed in the state in which there is a large amount of moisture remaining in the metal-containing solution and the wash solution in the precursor material (A), the skeletal structure as the regular mesopore material of the precursor material (A) may be broken, and thus it is preferable to dry them sufficiently.

(Step S3: Calcination Step)

Next, a precursor material (C) is obtained by calcining the precursor material (B) obtained by impregnating the precursor material (A) for obtaining the skeletal body of the porous structure composed of zeolite-type compound with the metal-containing solution.

For example, the calcination treatment is preferably performed in air, at 350 to 850° C. for 2 hours to 30 hours. The metal component that has entered the pores of the regular mesopore material undergoes crystal growth by such a calcination treatment, and metal oxide nanoparticles are formed in the pores.

(Step S4: Hydrothermal Treatment Step)

Subsequently, a mixed solvent of the precursor material (C) and the structure directing agent is then prepared, and the precursor material (C) obtained by calcining the precursor material (B) is hydrothermal treated to obtain a functional structural body.

The structure directing agent is a molding agent for defining the framework of the skeletal body of the functional structural body, for example the surfactant can be used. The structure directing agent is preferably selected according to the framework of the skeletal body of the functional structural body, and for example, a surfactant such as tetramethylammonium bromide (TMABr), tetraethylammonium bromide (TEABr), and tetrapropylammonium bromide (TPABr) are suitable.

The mixing of the precursor material (C) and the structure directing agent may be performed during the hydrothermal treatment step or may be performed before the hydrothermal treatment step. Furthermore, the method for preparing the mixed solvent is not particularly limited, and the precursor material (C), the structure directing agent, and the solvent may be mixed simultaneously, or each of the dispersion solutions may be mixed after the precursor material (C) and the structure directing agent are each dispersed in individual solutions. Examples of the solvent that can be used include water, an organic solvent such as alcohol, or a mixed solvent thereof. In addition, it is preferable that the pH of the mixed solvent is adjusted using an acid or a base prior to performing the hydrothermal treatment.

The hydrothermal treatment can be performed by a known method. For example, the hydrothermal treatment can be preferably performed at 0 to 2,000 kPa at 80 to 800° C. for 5 hours to 240 hours in a sealed container. Furthermore, the hydrothermal treatment is preferably performed under a basic condition.

Although the reaction mechanism here is not necessarily clear, by performing hydrothermal treatment using the precursor material (C) as a raw material, the skeletal structure as the regular mesopore material of the precursor material (C) becomes increasingly disrupted. However, the action of the structure directing agent forms a new framework (porous structure) as the skeletal body of the functional structural body while maintaining the position of the metal oxide nanoparticles within the pores of the precursor material (C). The functional structural body obtained in this way includes the skeletal body having the porous structure and metal oxide nanoparticles present in the skeletal body, and the skeletal body has a channel in which the plurality of pores connect with each other by the porous structure, and at least a portion of the metal oxide nanoparticles is present in the channel of the skeletal body.

Furthermore, in the present embodiment, in the hydrothermal treatment step, a mixed solvent in which the precursor material (C) and the structure directing agent are mixed is prepared, and the precursor material (C) is subjected to hydrothermal treatment, which is not a limitation. The precursor material (C) may be subjected to hydrothermal treatment without mixing the precursor material (C) and the structure directing agent.

The precipitate obtained after hydrothermal treatment (functional structural body) is preferably washed, dried, and calcined as necessary after recovery (e.g., filtration). Examples of the washing solution that can be used include water, an organic solvent such as alcohol, or a mixed solvent thereof. Drying treatments include overnight natural drying and high temperature drying at 150° C. or lower. Note that when calcination treatment is performed in the state in which there is a large amount of moisture remaining in the precipitate, the framework as a skeletal body of the functional structural body may be broken, and thus it is preferable to dry the precipitate sufficiently. For example, the calcination treatment can be also performed in air, at 350 to 850° C. for 2 hours to 30 hours. Such calcination treatment burns out the structure directing agent that has been attached to the functional structural body. Furthermore, the functional structural body can be used as-is without subjecting the recovered precipitate to calcination, depending on the intended use. For example, if the environment in which the functional structural body is used is a high temperature environment of an oxidizing atmosphere, exposing the functional structural body to a usage environment for a period of time allows the structure directing agent to be burned out and to obtain a functional structural body similar to that when subjected to calcination treatment. Thus, the obtained functional structural body can be used as is.

[Modified Example of Functional Structural Body 1]

Figure 4:
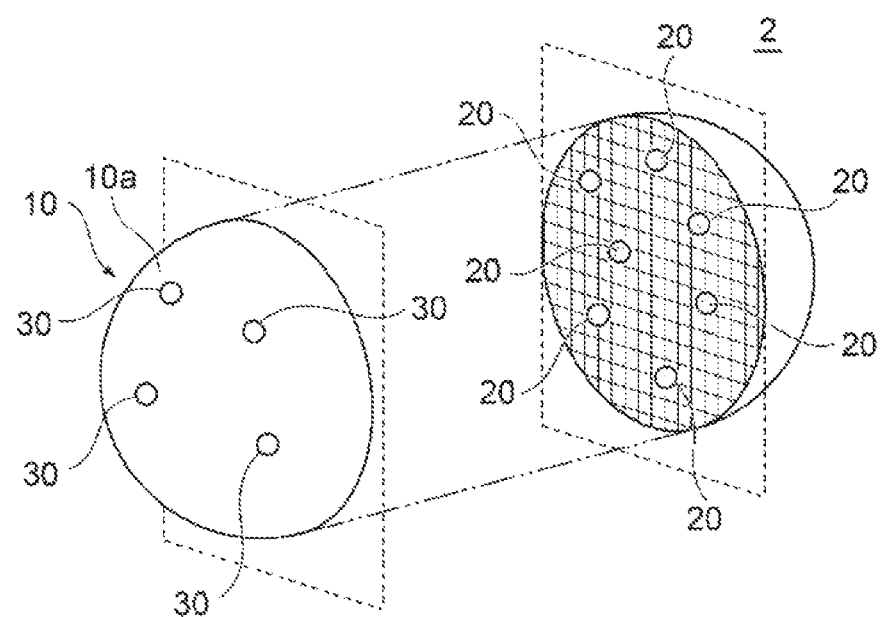
FIG. 4 is a schematic view illustrating a modified example of the functional structural body of FIGS. 1A and 1B.

FIG. 4 is a schematic view illustrating a modified example of the functional structural body 1 of FIGS. 1A and 1B.

Although the functional structural body 1 of FIGS. 1A and 1B illustrates the case in which it includes the skeletal body 10 and the metal oxide nanoparticles 20 present in the skeletal body 10, the functional structural body 1 is not limited to this configuration. For example, as illustrated in FIG. 4, the functional structural body 2 may further include at least one type of other metal oxide nanoparticles 30 held on the outer surface 10a of the skeletal body 10.

The other metal oxide nanoparticles 30 are substances that exhibit one or more functions. The functions of the other metal oxide nanoparticles 30 may be the same or different from the function of the metal oxide nanoparticles 20. A specific example of the function of the other metal oxide nanoparticles 30 is the same as that described for the metal oxide nanoparticles 20, and preferably has a catalytic function, and the metal oxide nanoparticles 30 are a catalytic substance. Also, if both of the metal oxide nanoparticles 20 and 30 are materials having the same function, the material of the other metal oxide nanoparticles 30 may be the same as or different from the material of the metal oxide nanoparticles 20. According to this configuration, the content of metal oxide nanoparticles held in the functional structural body 2 can be increased, and the functions of the metal oxide nanoparticles can be further accelerated.

In this case, the content of the at least one metal oxide nanoparticles 20 present in the skeletal body 10 is preferably greater than that of the other metal oxide nanoparticles 30 held on the outer surface 10a of the skeletal body 10. As a result, the function of the metal oxide nanoparticles 20 held inside the skeletal body 10 becomes dominant, and functions of the metal oxide nanoparticles are stably exhibited.

Hereinbefore, the functional structural body according to the present embodiments has been described, but the present disclosure is not limited to the above embodiments, and various modifications and changes are possible on the basis of the technical concept of the present disclosure.

EXAMPLES

Examples 1 to 384

[Synthesis of Precursor Material (A)]

A mixed aqueous solution was prepared by mixing a silica agent (tetraethoxysilane (TEOS), manufactured by Wako Pure Chemical Industries, Ltd.) and a surfactant as the molding agent. The pH was adjusted as appropriate, and hydrothermal treatment was performed at 80 to 350° C. for 100 hours in a sealed container. Thereafter, the produced precipitate was filtered out, washed with water and ethanol, and then calcined in air at 600° C. for 24 hours to obtain the precursor material (A) of the type and having the pore diameter (nm) shown in Tables 1 to 8. Note that the following surfactant was used depending on the type of the precursor material (A).

MCM-41: Hexadecyltrimethylammonium bromide (CTAB) (manufactured by Wako Pure Chemical Industries, Ltd.)

SBA-1: Pluronic P123 (manufactured by BASF)

[Preparation of Precursor Materials (B) and (C)]

Next, a metal-containing aqueous solution was prepared by dissolving a metal salt containing the metal element (M) in water according to the metal element (M) constituting the metal oxide nanoparticles of the type shown in Tables 1 to 8. Note that the metal salt was used in accordance with the type of metal oxide nanoparticles ("metal oxide nanoparticles: metal salt").

LaMnO$_3$: La—Mn nitrate salt (La(NO$_3$)$_3$.6H$_2$O (99%) and Mn (NO$_3$)$_2$.9H$_2$O (99%) were used, both manufactured by Wako Pure Chemical Industries, Ltd.)

BaMnO$_3$: Ba—Mn nitrate salt (Ba(NO$_3$)$_2$ (99%) and Mn(NO$_3$)$_2$.9H$_2$O (99%) were used, both manufactured by Wako Pure Chemical Industries, Ltd.

LaAlO$_3$: La—Al nitrate salt (La(NO$_3$)$_3$. 6H$_2$O (99%) and Al(NO$_3$)$_3$.9H$_2$O (99%) were used, both manufactured by Wako Pure Chemical Industries, Ltd.

LaCoO$_3$: La—Co nitrate salt (La(NO$_3$)$_3$. 6H$_2$O (99%) and Co(NO$_3$)$_2$.6H$_2$O (99%) were used, both manufactured by Wako Pure Chemical Industries, Ltd.

Next, a metal-containing solution was added to the powdered precursor material (A) in portions, and dried at room temperature (20° C.±10° C.) for 12 hours or longer to obtain the precursor material (B).

Note that when the presence or absence of additives shown in Tables 1 to 8 is "yes", pretreatment in which an aqueous solution of polyoxyethylene (15) oleyl ether (NIKKOL BO-15 V, manufactured by Nikko Chemicals Co., Ltd.) was added as the additive to the precursor material (A) prior to adding the metal-containing aqueous solution, and then the aqueous solution containing a metal was added as described above. Note that when "no" is used in the presence or absence of an additive, pretreatment with an additive such as that described above was been performed.

Furthermore, the added amount of the metal-containing aqueous solution added to the precursor material (A) was adjusted so that the value obtained by converting to a ratio of silicon (Si) constituting the precursor material (A) to a metal element (M) included in the metal-containing solution is in Tables 1 to 8.

Next, the precursor material (B) impregnated with the metal-containing aqueous solution obtained as described above was calcined in air at 600° C. for 24 hours to obtain the precursor material (C).

[Synthesis of Functional Structural Body]

The precursor material (C) obtained as described above and the structure directing agent shown in Tables 1 to 8 were mixed to produce a mixed aqueous solution. Hydrothermal treatment was performed under the conditions of at 80 to 350° C., at pH and time shown in Tables 1 to 8 in a sealed container. Thereafter, the produced precipitate was filtered out, washed with water, dried at 100° C. for 12 hours or longer, and further calcined in air at 600° C. for 24 hours to obtain a functional structural body having the skeletal body shown in Tables 1 to 8 and metal oxide nanoparticles as the catalytic substance (Example 1 to 384).

Comparative Example 1

In Comparative Example 1, the starting material for the hydroxide perovskite precursor was the same as in the examples. A mixed aqueous solution of 0.1 mol/l La—Mn nitrate solution was added dropwise to 19% ammonia water under stirring. After the addition, the mixture was filtered and dried at 110° C. overnight, thus obtaining a hydroxide perovskite precursor. The obtained perovskite hydroxide precursor and MFI type silicalite were added to pure water at a Si/M ratio of 100, dispersed using ultrasonic waves, evaporated to dryness, and calcined to obtain silicalite carrying LaMnO$_3$ on the outer surface of the skeletal body. MFI type silicalite was synthesized in a similar manner as in Examples 52 to 57 except for a step of adding a metal.

Comparative Example 2

In Comparative Example 2, MFI type silicalite was synthesized in a similar manner as in Comparative Example 1 except that the step of attaching LaMnO$_3$ to the outer surface of the skeletal body was omitted.

[Evaluation]

Various characteristic evaluations were performed on the functional structural bodies of the above examples and the silicalite of the comparative examples under the conditions described below.

[A] Cross Section Observation

An observation sample was produced using a pulverization method for the functional structural bodies of the examples described above and the silicalite carrying metal oxide nanoparticles of Comparative Example 1, and the cross section observation was performed using a transmission electron microscope (TEM) (TITAN G2, manufactured by FEI).

As a result, it was confirmed that, in the functional structural bodies of the examples described above, the metal oxide nanoparticles were present and held inside the skeletal body made from silicalite or zeolite (is capsulated in silicalite and zeolite). On the other hand, in the silicalite of Comparative Example 1, the metal oxide nanoparticles were only attached to the outer surface of the skeletal body and were not present inside the skeletal body.

[B] Average Inner Diameter of Channels of Skeletal Body and Average Particle Size of Metal Oxide Nanoparticles In the TEM image taken by the cross-sectional observation performed in evaluation [A] above, 500 channels of the skeletal body were randomly selected, and the respective major diameters and the minor diameters were measured, and the respective inner diameters were calculated from the average values (N=500), and the average value of the inner diameter was determined to be the average inner diameter $D_F$ of the channel of the skeletal body. In addition, for the metal oxide nanoparticles, 500 metal oxide nanoparticles were randomly selected from the TEM image, and the respective particle sizes were measured (N=500), and the average value thereof was determined to be the average particle size $D_C$ of the metal oxide nanoparticles. The results are shown in Tables 1 to 8.

[C] Relationship Between Added Amount of Metal-Containing Solution and Metal Amount Embedded in Skeletal Body A functional structural body in which metal oxide nanoparticles were embedded in the skeletal body at added amount of the ratio of number of atoms of Si/M=50, 100, 200, 1,000 (M=Co, Ni, Fe, Cu) was produced, and then the amount of metal (mass %) that was embedded in the skeletal body of the functional structural body produced at the above added amount was measured. Note that in the present measurement, a functional structural body having the ratio of number of atoms of Si/M=100, 200, 1000 is produced by adjusting the added amount of the metal-containing solution in the same manner as the functional structural body of the Si/M=100, 200, 1000 ratio of number of atoms of Examples 1 to 384, and Functional structural bodies with Si/M=50 ratio of number of atoms were made in the same manner as the functional structural body with the ratio of number of atoms of Si/M=100, 200, 1000, except that the added amount of the metal-containing solution was varied.

The amount of metal was quantified by ICP (radiofrequency inductively coupled plasma) alone or in combination with ICP and XRF (fluorescence X-ray analysis). XRF (energy dispersive fluorescent x-ray analyzer "SEA1200VX", manufactured by SII NanoTechnology Inc.) was performed under conditions of a vacuum atmosphere, an accelerating voltage 15 kV (using a Cr filter), or an accelerating voltage 50 kV (using a Pb filter).

XRF is a method for calculating the amount of metal present in terms of fluorescence intensity, and XRF alone cannot calculate a quantitative value (in terms of mass %). Therefore, the amount of metal of the functional structural body to which the metal was added at Si/M=100 was determined by ICP analysis, and the metal content of the functional structural body in which the metal was added at Si/M=50 and less than 100 was calculated based on XRF measurement results and ICP measurement results.

As a result, it was confirmed that the amount of metal embedded in the functional structural body increases as the added amount of the metal-containing solution increases, at least within a range that the ratio of number of atoms Si/M is within 50 to 1,000.

[D] Performance Evaluation

The catalytic capacity (performance) of the metal oxide nanoparticles (catalytic substance) was evaluated for the functional structural bodies of the examples described above and the silicalite of the comparative examples. The results are shown in Tables 1 to 8.

(1) Catalytic Activity

The catalytic activity was evaluated under the following conditions: First, 0.2 g of the functional structural body was charged in a normal pressure flow reactor, and a decomposition reaction of butyl benzene (model material for heavy oil) was performed with nitrogen gas ($N_2$) as a carrier gas (5 ml/min) at 400° C. for 2 hours. After completion of the reaction, the generated gas and the generated liquid that were collected were analyzed by gas chromatography (GC) and gas chromatography mass spectrometry (GC/MS) for the composition. Note that, as the analysis device, TRACE 1310 GC (available from Thermo Fisher Scientific Inc., detector: thermal conductivity detector, flame ionization detector), and TRACE DSQ (Thermo Fischer Scientific Inc., detector: mass detector, ionization method: EI (ion source temperature 250° C., MS transfer line temperature of 320° C.)) were used.

Furthermore, based on the results of the component analysis described above, the yield (mol %) of a compound having a molecular weight lower than that of butyl benzene (specifically, benzene, toluene, ethylbenzene, styrene, cumene, methane, ethane, ethylene, propane, propylene, butane, butene, and the like) was calculated. The yield of the compound was calculated as the percentage (mol %) of the total amount (mol) of the amount of the compound having a lower molecular weight than the butyl benzene contained in the production liquid (mol %) relative to the amount of butyl benzene material (mol) prior to the reaction.

In the present example, when the yield of a compound having a molecular weight lower than that of butyl benzene contained in the product liquid is 40 mol % or more, it is determined that catalytic activity (resolution) is excellent, and considered as "A". When it is 25 mol % or more and less than 40 mol %, it is determined that catalyst activity is good, and considered as "B". When it is 10 mol % or more and less than 25 mol %, it is determined that catalyst activity is not good, but is pass level (acceptable), and considered as "C". When it is less than 10 mol %, it is determined that catalyst activity is poor (not pass), and considered as "D".

(2) Durability (Life)

The durability was evaluated under the following conditions:

First, the functional structural body used in evaluation (1) above was recovered and heated at 650° C. for 12 hours to produce a functional structural body after heating. Next, a decomposition reaction of butyl benzene (model material of heavy oil) was performed by the similar method as in evaluation (1) above using the obtained functional structural body after heating, and component analysis of the generated gas and the generated liquid was performed in a similar manner as in the above evaluation (1). Based on the obtained analytical results, the yield (mol %) of a compound having a molecular weight lower than that of butyl benzene was determined in a similar manner as in evaluation (1) above. Furthermore, the degree of maintaining the yield of the above compound by the functional structural body after heating was compared to the yield of the above compound by the functional structural body prior to heating (the yield determined in evaluation (1) above). Specifically, the percentage (%) of the yield of the compound obtained by the functional structural body after heating (yield determined by evaluation (2) above) to the yield of the above compound by the functional structural body prior to heating (yield determined by the present evaluation (1) above) was calculated. In the present embodiment, when the yield of the compound (yield determined by the present evaluation (2)) of the above compound due to the functional structural body after heating (yield determined by the present evaluation (2)) is maintained at least 80% compared to the yield of the compound obtained by the functional structural body prior to heating (yield determined by evaluation (1) above), it is determined that durability (heat resistance) is excellent, and considered as "A". When it is maintained 60% or more and less than 80%, it is determined that durability (heat resistance) is good, and considered as "B". When it is maintained 40% or more and less than 60%, it is determined that durability (heat resistance) is not good, but is pass level (acceptable), and considered as "C". When it is reduced below 40%, it is determined that durability (heat resistance) is poor (not pass), and considered as "D". Performance evaluations similar to those of evaluation (1) and (2) above were also performed on Comparative Examples 1 and 2. Note that Comparative Example 2 is the skeletal body itself, and has no metal oxide nanoparticle. Therefore, in the performance evaluation described above, only the skeletal body of Comparative Example 2 was charged in place of the functional structural body. The results are shown in Table 8.

TABLE 1

| | Making Conditions of Functional Structural Body | | | | | | | Functional Structural Body | | | | | | |
|---|---|---|---|---|---|---|---|---|---|---|---|---|---|---|
| | Addition to Precursor Material (A) | | | | | | | Skeletal body Zeolite-Type Compound | | Metal Oxide Nanoparticles Catalytic Substance | | | Performance Evaluation | |
| | Precursor Material (A) | | Presence or Absence of Additives | Conversion Ratio (ratio of number of atoms) Si/M of Added Amount of Metal-containing Solution | Hydrothermal Treatment Conditions using Precursor Material (C) | | | | Average Inner Diameter of Channels $D_F$ (nm) | | Average particle Size $D_C$ (nm) | $D_C/D_F$ | Catalytic Activity | Durability |
| No. | Type | Pore Diameter (nm) | | | Type of Structure Directing agent | pH | Time (h) | Framework | | Type | | | | |
| Example 1 | MCM-41 | 1.3 | Yes | 1000 | TEABr | 12 | 120 | FAU | 0.74 | LaMnO₃ | 0.13 | 0.2 | C | C |
| Example 2 | | | | 500 | | | | | | | 0.40 | 0.5 | C | C |
| Example 3 | | | | 200 | | | | | | | 0.66 | 0.9 | B | C |
| Example 4 | | | | 100 | | | | | | | 1.32 | 1.8 | A | B |
| Example 5 | | 2.0 | | | | | | | | | 1.98 | 2.7 | A | B |
| Example 6 | | 2.4 | | | | | | | | | 2.38 | 3.2 | A | A |
| Example 7 | | 2.6 | | | | | | | | | 2.64 | 3.6 | A | A |
| Example 8 | | 3.3 | | | | | | | | | 3.30 | 4.5 | A | A |
| Example 9 | | 6.6 | | | | | | | | | 6.61 | 8.9 | B | A |
| Example 10 | SBA-1 | 13.2 | | | | | | | | | 13.21 | 17.9 | B | A |
| Example 11 | | 19.8 | | | | | | | | | 19.82 | 26.8 | C | A |
| Example 12 | | 26.4 | | | | | | | | | 26.43 | 35.7 | C | A |
| Example 13 | MCM-41 | 1.3 | None | 1000 | | | | | | | 0.13 | 0.2 | C | C |
| Example 14 | | | | 500 | | | | | | | 0.40 | 0.5 | C | C |
| Example 15 | | | | 200 | | | | | | | 0.66 | 0.9 | B | C |
| Example 16 | | | | 100 | | | | | | | 1.32 | 1.8 | A | B |
| Example 17 | | 2.0 | | | | | | | | | 1.98 | 2.7 | A | B |
| Example 18 | | 2.4 | | | | | | | | | 2.38 | 3.2 | B | A |
| Example 19 | | 2.6 | | | | | | | | | 2.64 | 3.6 | B | A |
| Example 20 | | 3.3 | | | | | | | | | 3.30 | 4.5 | B | A |
| Example 21 | | 6.6 | | | | | | | | | 6.61 | 8.9 | C | A |
| Example 22 | SBA-1 | 13.2 | | | | | | | | | 13.21 | 17.9 | C | A |
| Example 23 | | 19.8 | | | | | | | | | 19.82 | 26.8 | C | A |
| Example 24 | | 26.4 | | | | | | | | | 26.43 | 35.7 | C | A |
| Example 25 | MCM-41 | 1.1 | Yes | 1000 | | 11 | 72 | MTW | 0.61 | | 0.11 | 0.2 | C | C |
| Example 26 | | | | 500 | | | | | | | 0.33 | 0.5 | C | C |
| Example 27 | | | | 200 | | | | | | | 0.54 | 0.9 | B | C |
| Example 28 | | | | 100 | | | | | | | 1.09 | 1.8 | A | B |
| Example 29 | | 1.6 | | | | | | | | | 1.63 | 2.7 | A | B |
| Example 30 | | 2.0 | | | | | | | | | 1.96 | 3.2 | A | B |
| Example 31 | | 2.2 | | | | | | | | | 2.18 | 3.6 | A | A |
| Example 32 | | 2.7 | | | | | | | | | 2.72 | 4.5 | A | A |
| Example 33 | | 5.4 | | | | | | | | | 5.45 | 8.9 | B | A |
| Example 34 | SBA-1 | 10.9 | | | | | | | | | 10.89 | 17.9 | B | A |
| Example 35 | | 16.3 | | | | | | | | | 16.34 | 26.8 | C | A |
| Example 36 | | 21.8 | | | | | | | | | 21.79 | 35.7 | C | A |
| Example 37 | MCM-41 | 1.1 | None | 1000 | | | | | | | 0.11 | 0.2 | C | C |
| Example 38 | | | | 500 | | | | | | | 0.33 | 0.5 | C | C |
| Example 39 | | | | 200 | | | | | | | 0.54 | 0.9 | B | C |
| Example 40 | | | | 100 | | | | | | | 1.09 | 1.8 | A | B |
| Example 41 | | 1.6 | | | | | | | | | 1.63 | 2.7 | A | B |
| Example 42 | | 2.0 | | | | | | | | | 1.96 | 3.2 | A | B |
| Example 43 | | 2.2 | | | | | | | | | 2.18 | 3.6 | B | A |
| Example 44 | | 2.7 | | | | | | | | | 2.72 | 4.5 | B | A |
| Example 45 | | 5.4 | | | | | | | | | 5.45 | 8.9 | C | A |
| Example 46 | SBA-1 | 10.9 | | | | | | | | | 10.89 | 17.9 | C | A |
| Example 47 | | 16.3 | | | | | | | | | 16.34 | 26.8 | C | A |
| Example 48 | | 21.8 | | | | | | | | | 21.79 | 35.7 | C | A |

TABLE 2

| | Making Conditions of Functional Structural Body | | | | | | | | | | | | |
|---|---|---|---|---|---|---|---|---|---|---|---|---|---|
| | Addition to Precursor Material (A) | | | | | | | Functional Structural Body | | | | | |
| | | | | | | | | Skeletal body Zeolite-Type Compound | | | | | |
| | Precursor Material (A) | | Presence or Absence of Additives | Conversion Ratio (ratio of number of atoms) Si/M of Added Amount of Metal-containing Solution | Hydrothermal Treatment Conditions using Precursor Material (C) | | | Average Inner Diameter of Channels $D_F$ (nm) | Metal Oxide Nanoparticles Catalytic Substance | | | Performance Evaluation | |
| No. | Type | Pore Diameter (nm) | | | Type of Structure Directing agent | pH | Time (h) | Framework | | Type | Average particle Size $D_C$ (nm) | $D_C/D_F$ | Catalytic Activity | Durability |
| Example 49 | MCM-41 | 1.0 | Yes | 1000 | TPABr | 12 | 72 | MFI | 0.56 | LaMnO$_3$ | 0.10 | 0.2 | C | C |
| Example 50 | | | | 500 | | | | | | | 0.30 | 0.5 | C | C |
| Example 51 | | | | 200 | | | | | | | 0.50 | 0.9 | B | C |
| Example 52 | | | | 100 | | | | | | | 1.00 | 1.8 | A | B |
| Example 53 | | 1.5 | | | | | | | | | 1.50 | 2.7 | A | B |
| Example 54 | | 1.8 | | | | | | | | | 1.80 | 3.2 | A | A |
| Example 55 | | 2.0 | | | | | | | | | 2.00 | 3.6 | A | A |
| Example 56 | | 2.5 | | | | | | | | | 2.50 | 4.5 | A | A |
| Example 57 | | 5.0 | | | | | | | | | 5.00 | 8.9 | B | A |
| Example 58 | SBA-1 | 10.0 | | | | | | | | | 10.00 | 17.9 | B | A |
| Example 59 | | 15.0 | | | | | | | | | 15.00 | 26.8 | C | A |
| Example 60 | | 20.0 | | | | | | | | | 20.00 | 35.7 | C | A |
| Example 61 | MCM-41 | 1.0 | None | 1000 | | | | | | | 0.10 | 0.2 | C | C |
| Example 62 | | | | 500 | | | | | | | 0.30 | 0.5 | C | C |
| Example 63 | | | | 200 | | | | | | | 0.50 | 0.9 | B | C |
| Example 64 | | | | 100 | | | | | | | 1.00 | 1.8 | A | B |
| Example 65 | | 1.5 | | | | | | | | | 1.50 | 2.7 | A | B |
| Example 66 | | 1.8 | | | | | | | | | 1.80 | 3.2 | B | A |
| Example 67 | | 2.0 | | | | | | | | | 2.00 | 3.6 | B | A |
| Example 68 | | 2.5 | | | | | | | | | 2.50 | 4.5 | B | A |
| Example 69 | | 5.0 | | | | | | | | | 5.00 | 8.9 | C | A |
| Example 70 | SBA-1 | 10.0 | | | | | | | | | 10.00 | 17.9 | C | A |
| Example 71 | | 15.0 | | | | | | | | | 15.00 | 26.8 | C | A |
| Example 72 | | 20.0 | | | | | | | | | 20.00 | 35.7 | C | A |
| Example 73 | MCM-41 | 1.0 | Yes | 1000 | TMABr | 12 | 120 | FER | 0.57 | | 0.10 | 0.2 | C | C |
| Example 74 | | | | 500 | | | | | | | 0.31 | 0.5 | C | C |
| Example 75 | | | | 200 | | | | | | | 0.51 | 0.9 | B | C |
| Example 76 | | | | 100 | | | | | | | 1.02 | 1.8 | A | B |
| Example 77 | | 1.5 | | | | | | | | | 1.53 | 2.7 | A | B |
| Example 78 | | 1.8 | | | | | | | | | 1.83 | 3.2 | A | B |
| Example 79 | | 2.0 | | | | | | | | | 2.04 | 3.6 | A | A |
| Example 80 | | 2.5 | | | | | | | | | 2.54 | 4.5 | A | A |
| Example 81 | | 5.1 | | | | | | | | | 5.09 | 8.9 | B | A |
| Example 82 | SBA-1 | 10.2 | | | | | | | | | 10.18 | 17.9 | B | A |
| Example 83 | | 15.3 | | | | | | | | | 15.27 | 26.8 | C | A |
| Example 84 | | 20.4 | | | | | | | | | 20.36 | 35.7 | C | A |
| Example 85 | MCM-41 | 1.0 | None | 1000 | | | | | | | 0.10 | 0.2 | C | C |
| Example 86 | | | | 500 | | | | | | | 0.31 | 0.5 | C | C |
| Example 87 | | | | 200 | | | | | | | 0.51 | 0.9 | B | C |
| Example 88 | | | | 100 | | | | | | | 1.02 | 1.8 | A | B |
| Example 89 | | 1.5 | | | | | | | | | 1.53 | 2.7 | A | B |
| Example 90 | | 1.8 | | | | | | | | | 1.83 | 3.2 | A | B |
| Example 91 | | 2.0 | | | | | | | | | 2.04 | 3.6 | B | A |
| Example 92 | | 2.5 | | | | | | | | | 2.54 | 4.5 | B | A |
| Example 93 | | 5.1 | | | | | | | | | 5.09 | 8.9 | C | A |
| Example 94 | SBA-1 | 10.2 | | | | | | | | | 10.18 | 17.9 | C | A |
| Example 95 | | 15.3 | | | | | | | | | 15.27 | 26.8 | C | A |
| Example 96 | | 20.4 | | | | | | | | | 20.36 | 35.7 | C | A |

TABLE 3

| | Making Conditions of Functional Structural Body | | | | | | | | | | | |
|---|---|---|---|---|---|---|---|---|---|---|---|---|
| | Addition to Precursor Material (A) | | | | | | Functional Structural Body | | | | | |
| | | | | | | | Skeletal body Zeolite-Type Compound | | | | | |
| | Precursor Material (A) | | Presence or Absence of Additives | Conversion Ratio (ratio of number of atoms) Si/M of Added Amount of Metal-containing Solution | Hydrothermal Treatment Conditions using Precursor Material (C) | | | Average Inner Diameter of Channels $D_F$ (nm) | Metal Oxide Nanoparticles Catalytic Substance | | Performance Evaluation | |
| No. | Type | Pore Diameter (nm) | | | Type of Structure Directing agent | pH | Time (h) | Framework | | Type | Average particle Size $D_C$ (nm) | $D_C/D_F$ | Catalytic Activity | Durability |
| Example 97 | MCM-41 | 1.3 | Yes | 1000 | TEABr | 12 | 120 | FAU | 0.74 | BaMnO$_3$ | 0.13 | 0.2 | C | C |
| Example 98 | | | | 500 | | | | | | | 0.40 | 0.5 | C | C |
| Example 99 | | | | 200 | | | | | | | 0.66 | 0.9 | B | C |
| Example 100 | | | | 100 | | | | | | | 1.32 | 1.8 | A | B |
| Example 101 | | 2.0 | | | | | | | | | 1.98 | 2.7 | A | B |
| Example 102 | | 2.4 | | | | | | | | | 2.38 | 3.2 | A | A |
| Example 103 | | 2.6 | | | | | | | | | 2.64 | 3.6 | A | A |
| Example 104 | | 3.3 | | | | | | | | | 3.30 | 4.5 | A | A |
| Example 105 | | 6.6 | | | | | | | | | 6.61 | 8.9 | B | A |
| Example 106 | SBA-1 | 13.2 | | | | | | | | | 13.21 | 17.9 | B | A |
| Example 107 | | 19.8 | | | | | | | | | 19.82 | 26.8 | C | A |
| Example 108 | | 26.4 | | | | | | | | | 26.43 | 35.7 | C | A |
| Example 109 | MCM-41 | 1.3 | None | 1000 | | | | | | | 0.13 | 0.2 | C | C |
| Example 110 | | | | 500 | | | | | | | 0.40 | 0.5 | C | C |
| Example 111 | | | | 200 | | | | | | | 0.66 | 0.9 | B | C |
| Example 112 | | | | 100 | | | | | | | 1.32 | 1.8 | A | B |
| Example 113 | | 2.0 | | | | | | | | | 1.98 | 2.7 | A | B |
| Example 114 | | 2.4 | | | | | | | | | 2.38 | 3.2 | B | A |
| Example 115 | | 2.6 | | | | | | | | | 2.64 | 3.6 | B | A |
| Example 116 | | 3.3 | | | | | | | | | 3.30 | 4.5 | B | A |
| Example 117 | | 6.6 | | | | | | | | | 6.61 | 8.9 | C | A |
| Example 118 | SBA-1 | 13.2 | | | | | | | | | 13.21 | 17.9 | C | A |
| Example 119 | | 19.8 | | | | | | | | | 19.82 | 26.8 | C | A |
| Example 120 | | 26.4 | | | | | | | | | 26.43 | 35.7 | C | A |
| Example 121 | MCM-41 | 1.1 | Yes | 1000 | | 11 | 72 | MTW | 0.61 | | 0.11 | 0.2 | C | C |
| Example 122 | | | | 500 | | | | | | | 0.33 | 0.5 | C | C |
| Example 123 | | | | 200 | | | | | | | 0.54 | 0.9 | B | C |
| Example 124 | | | | 100 | | | | | | | 1.09 | 1.8 | A | B |
| Example 125 | | 1.6 | | | | | | | | | 1.63 | 2.7 | A | B |
| Example 126 | | 2.0 | | | | | | | | | 1.96 | 3.2 | A | B |
| Example 127 | | 2.2 | | | | | | | | | 2.18 | 3.6 | A | A |
| Example 128 | | 2.7 | | | | | | | | | 2.72 | 4.5 | A | A |
| Example 129 | | 5.4 | | | | | | | | | 5.45 | 8.9 | B | A |
| Example 130 | SBA-1 | 10.9 | | | | | | | | | 10.89 | 17.9 | B | A |
| Example 131 | | 16.3 | | | | | | | | | 16.34 | 26.8 | C | A |
| Example 132 | | 21.8 | | | | | | | | | 21.79 | 35.7 | C | A |
| Example 133 | MCM-41 | 1.1 | None | 1000 | | | | | | | 0.11 | 0.2 | C | C |
| Example 134 | | | | 500 | | | | | | | 0.33 | 0.5 | C | C |
| Example 135 | | | | 200 | | | | | | | 0.54 | 0.9 | B | C |
| Example 136 | | | | 100 | | | | | | | 1.09 | 1.8 | A | B |
| Example 137 | | 1.6 | | | | | | | | | 1.63 | 2.7 | A | B |
| Example 138 | | 2.0 | | | | | | | | | 1.96 | 3.2 | A | B |
| Example 139 | | 2.2 | | | | | | | | | 2.18 | 3.6 | B | A |
| Example 140 | | 2.7 | | | | | | | | | 2.72 | 4.5 | B | A |
| Example 141 | | 5.4 | | | | | | | | | 5.45 | 8.9 | C | A |
| Example 142 | SBA-1 | 10.9 | | | | | | | | | 10.89 | 17.9 | C | A |
| Example 143 | | 16.3 | | | | | | | | | 16.34 | 26.8 | C | A |
| Example 144 | | 21.8 | | | | | | | | | 21.79 | 35.7 | C | A |

TABLE 4

| | Making Conditions of Functional Structural Body | | | | | | | | | | | | |
|---|---|---|---|---|---|---|---|---|---|---|---|---|---|
| | Addition to Precursor Material (A) | | | | | | | Functional Structural Body | | | | | |
| | | | | | | | | Skeletal body Zeolite-Type Compound | | | | | |
| | Precursor Material (A) | | Presence or Absence of Additives | Conversion Ratio (ratio of number of atoms) Si/M of Added Amount of Metal-containing Solution | Hydrothermal Treatment Conditions using Precursor Material (C) | | | Average Inner Diameter of Channels $D_F$ (nm) | Metal Oxide Nanoparticles Catalytic Substance | | | Performance Evaluation | |
| No. | Type | Pore Diameter (nm) | | | Type of Structure Directing agent | pH | Time (h) | Framework | | Type | Average particle Size $D_C$ (nm) | $D_C/D_F$ | Catalytic Activity | Durability |
| Example 145 | MCM-41 | 1.0 | Yes | 1000 | TPABr | 12 | 72 | MFI | 0.56 | BaMnO$_3$ | 0.10 | 0.2 | C | C |
| Example 146 | | | | 500 | | | | | | | 0.30 | 0.5 | C | C |
| Example 147 | | | | 200 | | | | | | | 0.50 | 0.9 | B | C |
| Example 148 | | | | 100 | | | | | | | 1.00 | 1.8 | A | B |
| Example 149 | | 1.5 | | | | | | | | | 1.50 | 2.7 | A | B |
| Example 150 | | 1.8 | | | | | | | | | 1.80 | 3.2 | A | A |
| Example 151 | | 2.0 | | | | | | | | | 2.00 | 3.6 | A | A |
| Example 152 | | 2.5 | | | | | | | | | 2.50 | 4.5 | A | A |
| Example 153 | | 5.0 | | | | | | | | | 5.00 | 8.9 | B | A |
| Example 154 | SBA-1 | 10.0 | | | | | | | | | 10.00 | 17.9 | B | A |
| Example 155 | | 15.0 | | | | | | | | | 15.00 | 26.8 | C | A |
| Example 156 | | 20.0 | | | | | | | | | 20.00 | 35.7 | C | A |
| Example 157 | MCM-41 | 1.0 | None | 1000 | | | | | | | 0.10 | 0.2 | C | C |
| Example 158 | | | | 500 | | | | | | | 0.30 | 0.5 | C | C |
| Example 159 | | | | 200 | | | | | | | 0.50 | 0.9 | B | C |
| Example 160 | | | | 100 | | | | | | | 1.00 | 1.8 | A | B |
| Example 161 | | 1.5 | | | | | | | | | 1.50 | 2.7 | A | B |
| Example 162 | | 1.8 | | | | | | | | | 1.80 | 3.2 | B | A |
| Example 163 | | 2.0 | | | | | | | | | 2.00 | 3.6 | B | A |
| Example 164 | | 2.5 | | | | | | | | | 2.50 | 4.5 | B | A |
| Example 165 | | 5.0 | | | | | | | | | 5.00 | 8.9 | C | A |
| Example 166 | SBA-1 | 10.0 | | | | | | | | | 10.00 | 17.9 | C | A |
| Example 167 | | 15.0 | | | | | | | | | 15.00 | 26.8 | C | A |
| Example 168 | | 20.0 | | | | | | | | | 20.00 | 35.7 | C | A |
| Example 169 | MCM-41 | 1.0 | Yes | 1000 | TMABr | 12 | 120 | FER | 0.57 | | 0.10 | 0.2 | C | C |
| Example 170 | | | | 500 | | | | | | | 0.31 | 0.5 | C | C |
| Example 171 | | | | 200 | | | | | | | 0.51 | 0.9 | B | C |
| Example 172 | | | | 100 | | | | | | | 1.02 | 1.8 | A | B |
| Example 173 | | 1.5 | | | | | | | | | 1.53 | 2.7 | A | B |
| Example 174 | | 1.8 | | | | | | | | | 1.83 | 3.2 | A | B |
| Example 175 | | 2.0 | | | | | | | | | 2.04 | 3.6 | A | A |
| Example 176 | | 2.5 | | | | | | | | | 2.54 | 4.5 | A | A |
| Example 177 | | 5.1 | | | | | | | | | 5.09 | 8.9 | B | A |
| Example 178 | SBA-1 | 10.2 | | | | | | | | | 10.18 | 17.9 | B | A |
| Example 179 | | 15.3 | | | | | | | | | 15.27 | 26.8 | C | A |
| Example 180 | | 20.4 | | | | | | | | | 20.36 | 35.7 | C | A |
| Example 181 | MCM-41 | 1.0 | None | 1000 | | | | | | | 0.10 | 0.2 | C | C |
| Example 182 | | | | 500 | | | | | | | 0.31 | 0.5 | C | C |
| Example 183 | | | | 200 | | | | | | | 0.51 | 0.9 | B | C |
| Example 184 | | | | 100 | | | | | | | 1.02 | 1.8 | A | B |
| Example 185 | | 1.5 | | | | | | | | | 1.53 | 2.7 | A | B |
| Example 186 | | 1.8 | | | | | | | | | 1.83 | 3.2 | A | B |
| Example 187 | | 2.0 | | | | | | | | | 2.04 | 3.6 | B | A |
| Example 188 | | 2.5 | | | | | | | | | 2.54 | 4.5 | B | A |
| Example 189 | | 5.1 | | | | | | | | | 5.09 | 8.9 | C | A |
| Example 190 | SBA-1 | 10.2 | | | | | | | | | 10.18 | 17.9 | C | A |
| Example 191 | | 15.3 | | | | | | | | 0.56 | | 15.00 | 26.8 | C | A |
| Example 192 | | 20.4 | | | | | | | | | 20.00 | 35.7 | C | A |

TABLE 5

| | Making Conditions of Functional Structural Body | | | | | | | | | | | | |
|---|---|---|---|---|---|---|---|---|---|---|---|---|---|
| | Addition to Precursor Material (A) | | | | | | | Functional Structural Body | | | | | |
| | | | | | | | | Skeletal body Zeolite-Type Compound | | Metal Oxide Nanoparticles Catalytic Substance | | Performance Evaluation | |
| | Precursor Material (A) | | Presence or Absence of Additives | Conversion Ratio (ratio of number of atoms) Si/M of Added Amount of Metal-containing Solution | Hydrothermal Treatment Conditions using Precursor Material (C) | | | | Average Inner Diameter of Channels $D_F$ (nm) | | Average particle Size $D_C$ (nm) | | |
| No. | Type | Pore Diameter (nm) | | | Type of Structure Directing agent | pH | Time (h) | Framework | | Type | | $D_C/D_F$ | Catalytic Activity | Durability |
| Example 193 | MCM-41 | 1.3 | Yes | 1000 | TEABr | 12 | 120 | FAU | 0.74 | LaAlO$_3$ | 0.13 | 0.2 | C | C |
| Example 194 | | | | 500 | | | | | | | 0.40 | 0.5 | C | C |
| Example 195 | | | | 200 | | | | | | | 0.66 | 0.9 | B | C |
| Example 196 | | | | 100 | | | | | | | 1.32 | 1.8 | A | B |
| Example 197 | | 2.0 | | | | | | | | | 1.98 | 2.7 | A | B |
| Example 198 | | 2.4 | | | | | | | | | 2.38 | 3.2 | A | A |
| Example 199 | | 2.6 | | | | | | | | | 2.64 | 3.6 | A | A |
| Example 200 | | 3.3 | | | | | | | | | 3.30 | 4.5 | A | A |
| Example 201 | | 6.6 | | | | | | | | | 6.61 | 8.9 | B | A |
| Example 202 | SBA-1 | 13.2 | | | | | | | | | 13.21 | 17.9 | B | A |
| Example 203 | | 19.8 | | | | | | | | | 19.82 | 26.8 | C | A |
| Example 204 | | 26.4 | | | | | | | | | 26.43 | 35.7 | C | A |
| Example 205 | MCM-41 | 1.3 | None | 1000 | | | | | | | 0.13 | 0.2 | C | C |
| Example 206 | | | | 500 | | | | | | | 0.40 | 0.5 | C | C |
| Example 207 | | | | 200 | | | | | | | 0.66 | 0.9 | B | C |
| Example 208 | | | | 100 | | | | | | | 1.32 | 1.8 | A | B |
| Example 209 | | 2.0 | | | | | | | | | 1.98 | 2.7 | A | B |
| Example 210 | | 2.4 | | | | | | | | | 2.38 | 3.2 | B | A |
| Example 211 | | 2.6 | | | | | | | | | 2.64 | 3.6 | B | A |
| Example 212 | | 3.3 | | | | | | | | | 3.30 | 4.5 | B | A |
| Example 213 | | 6.6 | | | | | | | | | 6.61 | 8.9 | C | A |
| Example 214 | SBA-1 | 13.2 | | | | | | | | | 13.21 | 17.9 | C | A |
| Example 215 | | 19.8 | | | | | | | | | 19.82 | 26.8 | C | A |
| Example 216 | | 26.4 | | | | | | | | | 26.43 | 35.7 | C | A |
| Example 217 | MCM-41 | 1.1 | Yes | 1000 | | 11 | 72 | MTW | 0.61 | | 0.11 | 0.2 | C | C |
| Example 218 | | | | 500 | | | | | | | 0.33 | 0.5 | C | C |
| Example 219 | | | | 200 | | | | | | | 0.54 | 0.9 | B | C |
| Example 220 | | | | 100 | | | | | | | 1.09 | 1.8 | A | B |
| Example 221 | | 1.6 | | | | | | | | | 1.63 | 2.7 | A | B |
| Example 222 | | 2.0 | | | | | | | | | 1.96 | 3.2 | A | B |
| Example 223 | | 2.2 | | | | | | | | | 2.18 | 3.6 | A | A |
| Example 224 | | 2.7 | | | | | | | | | 2.72 | 4.5 | A | A |
| Example 225 | | 5.4 | | | | | | | | | 5.45 | 8.9 | B | A |
| Example 226 | SBA-1 | 10.9 | | | | | | | | | 10.89 | 17.9 | B | A |
| Example 227 | | 16.3 | | | | | | | | | 16.34 | 26.8 | C | A |
| Example 228 | | 21.8 | | | | | | | | | 21.79 | 35.7 | C | A |
| Example 229 | MCM-41 | 1.1 | None | 1000 | | | | | | | 0.11 | 0.2 | C | C |
| Example 230 | | | | 500 | | | | | | | 0.33 | 0.5 | C | C |
| Example 231 | | | | 200 | | | | | | | 0.54 | 0.9 | B | C |
| Example 232 | | | | 100 | | | | | | | 1.09 | 1.8 | A | B |
| Example 233 | | 1.6 | | | | | | | | | 1.63 | 2.7 | A | B |
| Example 234 | | 2.0 | | | | | | | | | 1.96 | 3.2 | A | B |
| Example 235 | | 2.2 | | | | | | | | | 2.18 | 3.6 | B | A |
| Example 236 | | 2.7 | | | | | | | | | 2.72 | 4.5 | B | A |
| Example 237 | | 5.4 | | | | | | | | | 5.45 | 8.9 | C | A |
| Example 238 | SBA-1 | 10.9 | | | | | | | | | 10.89 | 17.9 | C | A |
| Example 239 | | 16.3 | | | | | | | | | 16.34 | 26.8 | C | A |
| Example 240 | | 21.8 | | | | | | | | | 21.79 | 35.7 | C | A |

TABLE 6

| | Making Conditions of Functional Structural Body | | | | | | | | | | | | |
|---|---|---|---|---|---|---|---|---|---|---|---|---|---|
| | Addition to Precursor Material (A) | | | | | | | Functional Structural Body | | | | | |
| | | | | | | | | Skeletal body Zeolite-Type Compound | | | | | |
| | Precursor Material (A) | | Presence or Absence of Additives | Conversion Ratio (ratio of number of atoms) Si/M of Added Amount of Metal-containing Solution | Hydrothermal Treatment Conditions using Precursor Material (C) | | | | Average Inner Diameter of Channels $D_F$ (nm) | Metal Oxide Nanoparticles Catalytic Substance | | Performance Evaluation | |
| No. | Type | Pore Diameter (nm) | | | Type of Structure Directing agent | pH | Time (h) | Framework | | Type | Average particle Size $D_C$ (nm) | $D_C/D_F$ | Catalytic Activity | Durability |
| Example 241 | MCM-41 | 1.0 | Yes | 1000 | TPABr | 12 | 72 | MFI | 0.56 | LaAlO$_3$ | 0.10 | 0.2 | C | C |
| Example 242 | | | | 500 | | | | | | | 0.30 | 0.5 | C | C |
| Example 243 | | | | 200 | | | | | | | 0.50 | 0.9 | B | C |
| Example 244 | | | | 100 | | | | | | | 1.00 | 1.8 | A | B |
| Example 245 | | 1.5 | | | | | | | | | 1.50 | 2.7 | A | B |
| Example 246 | | 1.8 | | | | | | | | | 1.80 | 3.2 | A | A |
| Example 247 | | 2.0 | | | | | | | | | 2.00 | 3.6 | A | A |
| Example 248 | | 2.5 | | | | | | | | | 2.50 | 4.5 | A | A |
| Example 249 | | 5.0 | | | | | | | | | 5.00 | 8.9 | B | A |
| Example 250 | SBA-1 | 10.0 | | | | | | | | | 10.00 | 17.9 | B | A |
| Example 251 | | 15.0 | | | | | | | | | 15.00 | 26.8 | C | A |
| Example 252 | | 20.0 | | | | | | | | | 20.00 | 44.6 | C | A |
| Example 253 | MCM-41 | 1.0 | None | 1000 | | | | | | | 0.10 | 0.2 | C | C |
| Example 254 | | | | 500 | | | | | | | 0.30 | 0.5 | C | C |
| Example 255 | | | | 200 | | | | | | | 0.50 | 0.9 | B | C |
| Example 256 | | | | 100 | | | | | | | 1.00 | 1.8 | A | B |
| Example 257 | | 1.5 | | | | | | | | | 1.50 | 2.7 | A | B |
| Example 258 | | 2.0 | | | | | | | | | 2.00 | 3.6 | B | A |
| Example 259 | | 2.5 | | | | | | | | | 2.50 | 4.5 | B | A |
| Example 260 | | 0.5 | | | | | | | | | 5.00 | 8.9 | B | A |
| Example 261 | | 6.0 | | | | | | | | | 6.00 | 10.7 | C | A |
| Example 262 | SBA-1 | 10.0 | | | | | | | | | 10.00 | 17.9 | C | A |
| Example 263 | | 15.0 | | | | | | | | | 15.00 | 26.8 | C | A |
| Example 264 | | 20.0 | | | | | | | | | 20.00 | 35.7 | C | A |
| Example 265 | MCM-41 | 1.0 | Yes | 1000 | TMABr | 12 | 120 | FER | 0.57 | | 0.10 | 0.2 | C | C |
| Example 266 | | | | 500 | | | | | | | 0.31 | 0.5 | C | C |
| Example 267 | | | | 200 | | | | | | | 0.51 | 0.9 | B | C |
| Example 268 | | | | 100 | | | | | | | 1.02 | 1.8 | A | B |
| Example 269 | | 1.5 | | | | | | | | | 1.53 | 2.7 | A | B |
| Example 270 | | 1.8 | | | | | | | | | 1.83 | 3.2 | A | B |
| Example 271 | | 2.0 | | | | | | | | | 2.04 | 3.6 | A | A |
| Example 272 | | 2.5 | | | | | | | | | 2.54 | 4.5 | A | A |
| Example 273 | | 5.1 | | | | | | | | | 5.09 | 8.9 | B | A |
| Example 274 | SBA-1 | 10.2 | | | | | | | | | 10.18 | 17.9 | B | A |
| Example 275 | | 15.3 | | | | | | | | | 15.27 | 26.8 | C | A |
| Example 276 | | 20.4 | | | | | | | | | 20.36 | 35.7 | C | A |
| Example 277 | MCM-41 | 1.0 | None | 1000 | | | | | | | 0.10 | 0.2 | C | C |
| Example 278 | | | | 500 | | | | | | | 0.31 | 0.5 | C | C |
| Example 279 | | | | 200 | | | | | | | 0.51 | 0.9 | B | C |
| Example 280 | | | | 100 | | | | | | | 1.02 | 1.8 | A | B |
| Example 281 | | 1.5 | | | | | | | | | 1.53 | 2.7 | A | B |
| Example 282 | | 1.8 | | | | | | | | | 1.83 | 3.2 | A | B |
| Example 283 | | 2.0 | | | | | | | | | 2.04 | 3.6 | B | A |
| Example 284 | | 2.5 | | | | | | | | | 2.54 | 4.5 | B | A |
| Example 285 | | 5.1 | | | | | | | | | 5.09 | 8.9 | C | A |
| Example 286 | SBA-1 | 10.2 | | | | | | | | | 10.18 | 17.9 | C | A |
| Example 287 | | 15.3 | | | | | | | | | 15.27 | 26.8 | C | A |
| Example 288 | | 20.4 | | | | | | | | | 20.36 | 35.7 | C | A |

TABLE 7

| | Making Conditions of Functional Structural Body | | | | | | | | | | | |
|---|---|---|---|---|---|---|---|---|---|---|---|---|
| | Addition to Precursor Material (A) | | | | | | | Functional Structural Body | | | | |
| | | | | | | | | Skeletal body Zeolite-Type Compound | | | | |
| | Precursor Material (A) | | Presence or Absence of Additives | Conversion Ratio (ratio of number of atoms) Si/M of Added Amount of Metal-containing Solution | Hydrothermal Treatment Conditions using Precursor Material (C) | | | | Metal Oxide Nanoparticles Catalytic Substance | | | Performance Evaluation |
| No. | Type | Pore Diameter (nm) | | | Type of Structure Directing agent | pH | Time (h) | Framework | Average Inner Diameter of Channels $D_F$ (nm) | Type | Average particle Size $D_C$ (nm) | $D_C/D_F$ | Catalytic Activity / Durability |
| Example 289 | MCM-41 | 1.3 | Yes | 1000 | TEABr | 12 | 120 | FAU | 0.74 | LaCoO$_3$ | 0.13 | 0.2 | C / C |
| Example 290 | | | | 500 | | | | | | | 0.40 | 0.5 | C / C |
| Example 291 | | | | 200 | | | | | | | 0.66 | 0.9 | B / C |
| Example 292 | | | | 100 | | | | | | | 1.32 | 1.8 | A / B |
| Example 293 | | 2.0 | | | | | | | | | 1.98 | 2.7 | A / B |
| Example 294 | | 2.4 | | | | | | | | | 2.38 | 3.2 | A / A |
| Example 295 | | 2.6 | | | | | | | | | 2.64 | 3.6 | A / A |
| Example 296 | | 3.3 | | | | | | | | | 3.30 | 4.5 | A / A |
| Example 297 | | 6.6 | | | | | | | | | 6.61 | 8.9 | B / A |
| Example 298 | SBA-1 | 13.2 | | | | | | | | | 13.21 | 17.9 | B / A |
| Example 299 | | 19.8 | | | | | | | | | 19.82 | 26.8 | C / A |
| Example 300 | | 26.4 | | | | | | | | | 26.43 | 35.7 | C / A |
| Example 301 | MCM-41 | 1.3 | None | 1000 | | | | | | | 0.13 | 0.2 | C / C |
| Example 302 | | | | 500 | | | | | | | 0.40 | 0.5 | C / C |
| Example 303 | | | | 200 | | | | | | | 0.66 | 0.9 | B / C |
| Example 304 | | | | 100 | | | | | | | 1.32 | 1.8 | A / B |
| Example 305 | | 2.0 | | | | | | | | | 1.98 | 2.7 | A / B |
| Example 306 | | 2.4 | | | | | | | | | 2.38 | 3.2 | B / A |
| Example 307 | | 2.6 | | | | | | | | | 2.64 | 3.6 | B / A |
| Example 308 | | 3.3 | | | | | | | | | 3.30 | 4.5 | B / A |
| Example 309 | | 6.6 | | | | | | | | | 6.61 | 8.9 | C / A |
| Example 310 | SBA-1 | 13.2 | | | | | | | | | 13.21 | 17.9 | C / A |
| Example 311 | | 19.8 | | | | | | | | | 19.82 | 26.8 | C / A |
| Example 312 | | 26.4 | | | | | | | | | 26.43 | 35.7 | C / A |
| Example 313 | MCM-41 | 1.1 | Yes | 1000 | | 11 | 72 | MTW | 0.61 | | 0.11 | 0.2 | C / C |
| Example 314 | | | | 500 | | | | | | | 0.33 | 0.5 | C / C |
| Example 315 | | | | 200 | | | | | | | 0.54 | 0.9 | B / C |
| Example 316 | | | | 100 | | | | | | | 1.09 | 1.8 | A / B |
| Example 317 | | 1.6 | | | | | | | | | 1.63 | 2.7 | A / B |
| Example 318 | | 2.0 | | | | | | | | | 1.96 | 3.2 | A / B |
| Example 319 | | 2.2 | | | | | | | | | 2.18 | 3.6 | A / A |
| Example 320 | | 2.7 | | | | | | | | | 2.72 | 4.5 | A / A |
| Example 321 | | 5.4 | | | | | | | | | 5.45 | 8.9 | B / A |
| Example 322 | SBA-1 | 10.9 | | | | | | | | | 10.89 | 17.9 | B / A |
| Example 323 | | 16.3 | | | | | | | | | 16.34 | 26.8 | C / A |
| Example 324 | | 21.8 | | | | | | | | | 21.79 | 35.7 | C / A |
| Example 325 | MCM-41 | 1.1 | None | 1000 | | | | | | | 0.11 | 0.2 | C / C |
| Example 326 | | | | 500 | | | | | | | 0.33 | 0.5 | C / C |
| Example 327 | | | | 200 | | | | | | | 0.54 | 0.9 | B / C |
| Example 328 | | | | 100 | | | | | | | 1.09 | 1.8 | A / B |
| Example 329 | | 1.6 | | | | | | | | | 1.63 | 2.7 | A / B |
| Example 330 | | 2.0 | | | | | | | | | 1.96 | 3.2 | A / B |
| Example 331 | | 2.2 | | | | | | | | | 2.18 | 3.6 | B / A |
| Example 332 | | 2.7 | | | | | | | | | 2.72 | 4.5 | B / A |
| Example 333 | | 5.4 | | | | | | | | | 5.45 | 8.9 | C / A |
| Example 334 | SBA-1 | 10.9 | | | | | | | | | 10.89 | 17.9 | C / A |
| Example 335 | | 16.3 | | | | | | | | | 16.34 | 26.8 | C / A |
| Example 336 | | 21.8 | | | | | | | | | 21.79 | 35.7 | C / A |

TABLE 8

Making Conditions of Functional Structural Body

| | Addition to Precursor Material (A) | | | | Functional Structural Body | | | | | | |
|---|---|---|---|---|---|---|---|---|---|---|---|
| | | | | Hydrothermal Treatment Conditions using Precursor Material (C) | | | Skeletal body Zeolite-Type Compound | | Metal Oxide Nanoparticles Catalytic Substance | | Performance Evaluation |
| | Precursor Material (A) | Presence or Absence of Additives | Conversion Ratio (ratio of number of atoms) Si/M of Added Amount of Metal-containing Solution | | | | | Average Inner Diameter of Channels $D_F$ (nm) | | Average particle Size $D_C$ | |
| No. | Type / Pore Diameter (nm) | | | Type of Structure Directing agent | pH | Time (h) | Framework | | Type | (nm) / $D_C/D_F$ | Catalytic Activity / Durability |
| Example 337 | MCM-41 / 1.0 | Yes | 1000 | TPABr | 12 | 72 | MFI | 0.56 | LaCoO$_3$ | 0.10 / 0.2 | C / C |
| Example 338 | | | 500 | | | | | | | 0.30 / 0.5 | C / C |
| Example 339 | | | 200 | | | | | | | 0.50 / 0.9 | B / C |
| Example 340 | | | 100 | | | | | | | 1.00 / 1.8 | A / B |
| Example 341 | 1.5 | | | | | | | | | 1.50 / 2.7 | A / B |
| Example 342 | 1.8 | | | | | | | | | 1.80 / 3.2 | A / A |
| Example 343 | 2.0 | | | | | | | | | 2.00 / 3.6 | A / A |
| Example 344 | 2.5 | | | | | | | | | 2.50 / 4.5 | A / A |
| Example 345 | 5.0 | | | | | | | | | 5.00 / 8.9 | B / A |
| Example 346 | SBA-1 / 10.0 | | | | | | | | | 10.00 / 17.9 | B / A |
| Example 347 | 15.0 | | | | | | | | | 15.00 / 26.8 | C / A |
| Example 348 | 20.0 | | | | | | | | | 20.00 / 35.7 | C / A |
| Example 349 | MCM-41 / 1.0 | None | 1000 | | | | | | | 0.10 / 0.2 | C / C |
| Example 350 | | | 500 | | | | | | | 0.30 / 0.5 | C / C |
| Example 351 | | | 200 | | | | | | | 0.50 / 0.9 | B / C |
| Example 352 | | | 100 | | | | | | | 1.00 / 1.8 | A / B |
| Example 353 | 1.5 | | | | | | | | | 1.50 / 2.7 | A / B |
| Example 354 | 1.8 | | | | | | | | | 1.80 / 3.2 | B / A |
| Example 355 | 2.0 | | | | | | | | | 2.00 / 3.6 | B / A |
| Example 356 | 2.5 | | | | | | | | | 2.50 / 4.5 | B / A |
| Example 357 | 5.0 | | | | | | | | | 5.00 / 8.9 | C / A |
| Example 358 | SBA-1 / 10.0 | | | | | | | | | 10.00 / 17.9 | C / A |
| Example 359 | 15.0 | | | | | | | | | 15.00 / 26.8 | C / A |
| Example 360 | 20.0 | | | | | | | | | 20.00 / 35.7 | C / A |
| Example 361 | MCM-41 / 1.0 | Yes | 1000 | TMABr | 12 | 120 | FER | 0.57 | | 0.10 / 0.2 | C / C |
| Example 362 | | | 500 | | | | | | | 0.31 / 0.5 | C / C |
| Example 363 | | | 200 | | | | | | | 0.51 / 0.9 | B / C |
| Example 364 | | | 100 | | | | | | | 1.02 / 1.8 | A / B |
| Example 365 | 1.5 | | | | | | | | | 1.53 / 2.7 | A / B |
| Example 366 | 1.8 | | | | | | | | | 1.83 / 3.2 | A / B |
| Example 367 | 2.0 | | | | | | | | | 2.04 / 3.6 | A / A |
| Example 368 | 2.5 | | | | | | | | | 2.54 / 4.5 | A / A |
| Example 369 | 5.1 | | | | | | | | | 5.09 / 8.9 | B / A |
| Example 370 | SBA-1 / 10.2 | | | | | | | | | 10.18 / 17.9 | B / A |
| Example 371 | 15.3 | | | | | | | | | 15.27 / 26.8 | C / A |
| Example 372 | 20.4 | | | | | | | | | 20.36 / 35.7 | C / A |
| Example 373 | MCM-41 / 1.0 | None | 1000 | | | | | | | 0.10 / 0.2 | C / C |
| Example 374 | | | 500 | | | | | | | 0.31 / 0.5 | C / C |
| Example 375 | | | 200 | | | | | | | 0.51 / 0.9 | B / C |
| Example 376 | | | 100 | | | | | | | 1.02 / 1.8 | A / B |
| Example 377 | 1.5 | | | | | | | | | 1.53 / 2.7 | A / B |
| Example 378 | 1.8 | | | | | | | | | 1.83 / 3.2 | A / B |
| Example 379 | 2.0 | | | | | | | | | 2.04 / 3.6 | B / A |
| Example 380 | 2.5 | | | | | | | | | 2.54 / 4.5 | B / A |
| Example 381 | 5.1 | | | | | | | | | 5.09 / 8.9 | C / A |
| Example 382 | SBA-1 / 10.2 | | | | | | | | | 10.18 / 17.9 | C / A |
| Example 383 | 15.3 | | | | | | | | | 15.27 / 26.8 | C / A |
| Example 384 | 20.4 | | | | | | | | | 20.36 / 35.7 | C / A |
| Comparative Example 1 | — | | | | | | MFI | 0.56 | LaMnO$_3$ | ≤50 / ≤89.3 | C / D |
| Comparative Example 2 | — | | | | | | MFI | 0.56 | | | D / D |

As can be seen from Tables 1 to 8, the functional structural bodies (Examples 1 to 384), which were confirmed by cross sectional observation to hold the metal oxide nanoparticles inside the skeletal body were found to exhibit excellent catalytic activity in the decomposition reaction of butyl benzene and excellent durability as a catalyst compared to the silicalite in which the metal oxide nanoparticles were simply adhered to the outer surface of the skeletal body (Comparative Example 1) or the skeletal body itself having no functional substance (Comparative Example 2).

In addition, the relationship between the amount of metal (mass %) embedded in the skeletal body of the functional structural body measured in the evaluation [C], and the yield (mol %) of a compound having a molecular weight smaller than that of butyl benzene contained in the production liquid was evaluated. The evaluation method was the same as the evaluation method performed in "(1) catalytic activity" in the [D] "performance evaluation" described above.

As a result, in each example, when the amount of the metal-containing solution added to the precursor material (A) was from 50 to 200 in terms of the ratio of number of atoms Si/M (M=La and Mn) (the content of the metal element (M) of the metal oxide nanoparticles relative to the functional structural body was from 0.5 to 2.5 mass %), the yield of the compound having a molecular weight lower than that of butyl benzene contained in the product liquid was 32 mol % or greater, and the catalytic activity in the decomposition reaction of butyl benzene was found to be greater than or equal to the pass level.

On the other hand, the functional structural body of Comparative Example 1, in which the metal oxide nanoparticles were attached only to the outer surface of the skeletal body, exhibited improved catalytic activity in the decomposition reaction of butyl benzene compared to the skeletal body of Comparative Example 2 having no metal oxide nanoparticles, but exhibited inferior durability as a catalyst compared to the functional structural bodies of Examples 1 to 384.

In addition, the skeletal body of Comparative Example 2 having no metal oxide nanoparticle exhibited little catalytic activity in the decomposition reaction of butyl benzene, and were inferior in both the catalytic activity and the durability to the functional structural bodies of Examples 1 to 384.

REFERENCE SIGNS LIST

1 Functional structural body
10 Skeletal body
10a Outer surface
11 Channel of skeletal body
11a Pore
12 Enlarged pore portion of channel
20 Metal oxide nanoparticles
30 Metal oxide nanoparticles
$D_C$ Average particle size of metal oxide nanoparticles
$D_F$ Average Inner Diameter of Channels
$D_E$ Inner diameter of enlarged pore portion

What is claimed is:

1. A structural body, comprising:
a skeletal body of a porous structure composed of a zeolite-type compound; and
at least one metal oxide nanoparticle containing a perovskite-type oxide present in the skeletal body, wherein
the zeolite-type compound is selected from the group consisting of zeolites, cation exchanged zeolites and silicalites,
a framework of the zeolite-type compound is selected from the group consisting of FAU type (Y type or X type), MTW type, MFI type (ZSM-5), FER type (ferrierite), LTA type (A type), MWW type (MCM-22), MOR type (mordenite), LTL type (L type), and BEA type (beta type),
the skeletal body has channels connecting with each other,
the metal oxide nanoparticle is present at least in the channels of the skeletal body,
the channels have any one of a one-dimensional pore, a two-dimensional pore, and a three-dimensional pore defined by a framework of the zeolite-type compound and an enlarged pore portion with a diameter greater than that of any of the one-dimensional pore, the two-dimensional pore, and the three-dimensional pore and not defined by the framework of the zeolite-type compound, and the enlarged pore portion is greater than or equal to a diameter of the metal oxide nanoparticle,
a particle size of the metal oxide nanoparticle is greater than an inner diameter of any one of the one-dimensional pore, the two-dimensional pore, and the three-dimensional pore defined by the framework of the zeolite-type compound,
the metal oxide nanoparticle is present at least in the enlarged pore portion,
and
the perovskite-type oxide is selected from the group consisting of $LaBO_3$ (B=Mn, Cr, Co, Fe, Al, Pd or Mg), $BaZrO_3$, $La_{0.8}Sr_{0.2}Ga_{0.8}Mg_{0.2}O_3$ (LSGM), $LaFe_{0.57}Co_{0.38}Pd_{0.05}O_3$, $Ba_{0.8}La_{0.2}Mn_{0.2}O_3$.

2. The structural body according to claim 1 wherein the enlarged pore portion makes a plurality of pores, which constitute any one of the one-dimensional pore, the two-dimensional pore, and the three-dimensional pore, connect with one another.

3. The structural body according to claim 1, wherein an average particle size of the metal oxide nanoparticle is greater than an average inner diameter of the channels and is less than or equal to the inner diameter of the enlarged pore portion.

4. The structural body according to claim 1, wherein the metal oxide nanoparticle is a catalytic substance.

5. The structural body according to claim 1, wherein a metal element (M) of the metal oxide nanoparticle is contained in an amount of 0.5 mass % to 2.5 mass % based on the structural body.

6. The structural body according to claim 1, wherein an average particle size of the metal oxide nanoparticle is from 0.1 nm to 50 nm.

7. The structural body according to claim 1, wherein a ratio of an average particle size of the metal oxide nanoparticle to an average inner diameter of the channels is from 0.06 to 500.

8. The structural body according to claim 7, wherein the ratio of the average particle size of the metal oxide nanoparticle to the average inner diameter of the channels is from 0.1 to 45.

9. The structural body according to claim 8, wherein the ratio of the average particle size of the metal oxide nanoparticle to the average inner diameter of the channels is from 1.7 to 4.5.

10. The structural body according to claim 1, wherein
an average inner diameter of the channels is from 0.1 nm to 1.5 nm, and
the inner diameter of the enlarged pore portion is from 0.5 to 50 nm.

11. The structural body according to claim 1, further comprising at least one other metal oxide nanoparticle held on the outer surface of the skeletal body.

12. The structural body according to claim 11, wherein a content of the at least one metal oxide nanoparticle present in the skeletal body is greater than that of the at least one other metal oxide nanoparticle held on the outer surface of the skeletal body.

13. The structural body according to claim 1, wherein the zeolite-type compound comprises a plurality of pores less than 1 nm in diameter.

* * * * *